United States Patent
Weaver et al.

(10) Patent No.: US 12,153,368 B2
(45) Date of Patent: Nov. 26, 2024

(54) METHOD FOR DETECTING AN ISSUE WITH AN INDUSTRIAL PRINTER

(71) Applicant: Videojet Technologies Inc., Wood Dale, IL (US)

(72) Inventors: Robert Weaver, Wood Dale, IL (US); Fred Susi, Wood Dale, IL (US); Michael John McCormick, Wood Dale, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 18/266,152

(22) PCT Filed: Dec. 10, 2021

(86) PCT No.: PCT/US2021/062861
§ 371 (c)(1),
(2) Date: Jun. 8, 2023

(87) PCT Pub. No.: WO2022/125932
PCT Pub. Date: Jun. 16, 2022

(65) Prior Publication Data
US 2024/0027947 A1    Jan. 25, 2024

Related U.S. Application Data

(60) Provisional application No. 63/124,474, filed on Dec. 11, 2020.

(51) Int. Cl.
*G03G 15/00* (2006.01)
*G06F 3/12* (2006.01)

(52) U.S. Cl.
CPC ............ *G03G 15/55* (2013.01); *G06F 3/121* (2013.01); *G06F 3/1234* (2013.01); *G06F 3/1282* (2013.01); *G03G 15/5079* (2013.01)

(58) Field of Classification Search
CPC ...... G06F 3/121; G06F 3/1234; G06F 3/1282; G03G 15/507
See application file for complete search history.

(56) References Cited

U.S. PATENT DOCUMENTS

| 6,847,465 B1 | 1/2005 | Wetchler et al. | |
| 2016/0098234 A1* | 4/2016 | Weaver | G06F 3/1234 358/1.15 |

(Continued)

FOREIGN PATENT DOCUMENTS

| EP | 3 422 272 A1 | 1/2019 |
| WO | WO-2019/199674 A1 | 10/2019 |

OTHER PUBLICATIONS

International Search Report and Written Opinion for PCT Application No. PCT/US2021/062861, dated Apr. 8, 2022, pp. 1-12.

(Continued)

*Primary Examiner* — John R Wallace
(74) *Attorney, Agent, or Firm* — FOLEY & LARDNER LLP

(57) ABSTRACT

There is provided a computer implemented method comprising, receiving data associated with an industrial printer, the industrial printer operating on a print line and executing a print job, determining, based on the data associated with the industrial printer, an issue associated with the industrial printer, determining, based on the issue, whether the industrial printer requires remedial action or if the industrial printer can continue to be operated with the issue.

20 Claims, 7 Drawing Sheets

(56) References Cited

U.S. PATENT DOCUMENTS

2017/0197447 A1\* 7/2017 Soriano Fosas ... G03G 15/5004
2021/0263792 A1\* 8/2021 Vah ........................ G06N 3/044

OTHER PUBLICATIONS

EP Search Report issued for EP App No. 21904487.2 dated Sep. 10, 2024 (9 pages).

\* cited by examiner

METHOD FOR DETECTING AN ISSUE WITH AN INDUSTRIAL PRINTER

CROSS-REFERENCE TO RELATED APPLICATIONS

The present application is a U.S. national stage application of International Application No. PCT/US2021/062861, filed Dec. 10, 2021, which claims priority to U.S. Provisional Application. No. 63/124,474, filed Dec. 11, 2020, both of which are incorporated herein by reference in their entireties and for all purposes.

The disclosed subject matter relates to methods for detecting issues with industrial printers.

Industrial printers, such as continuous inkjet printers, laser marking devices, thermal transfer overprinters (TTO), thermal inkjet printers (TIJ), continuous inkjet printers (CIJ), label coding machines etc. are usually used to mark products being transported along a print line. For example, products may be transported along a conveyor and marked by an industrial printer as the product passes the industrial printer. The industrial printer may mark the product with information such as a date, lot number, product information, etc. Labelling machines may affix a label to a product as it is transported along the print line. Labelling machines may also comprise an industrial printer for marking the label to be affix to the product.

A print line may comprise multiple industrial printers, where each printer may be configured to mark a different part of a product, or mark the product with different information. For example, a thermal inkjet printer may be used to mark a first part of a product, and a laser marking device may be used to mark a second part of the product. The more industrial printers that are used in a print line, the higher the likelihood that an issue may occur in a given printer on the print line. Print downtime due to industrial printer issues or failures (such as faults that stop printers from printing) can have a significant effect on the operation of the print line. For example, regulated products such as in pharmaceuticals, and/or products that spoil such as dairy may be adversely affected if the production line is shut down due to a fault on an industrial printer, even for a short period of time.

It is an object of the present disclosure to address one or more problems associated with industrial printers.

In a first aspect, there is provided a computer implemented method, the method comprising receiving data associated with an industrial printer, the industrial printer operating on a print line and executing a print job, determining, based on the data associated with the industrial printer, an issue associated with the industrial printer, determining, based on the issue, whether the industrial printer requires remedial action or if the industrial printer can continue to be operated with the issue.

Advantageously, the method allows a determination to be made as to whether a print job can continue, even if sub-optimally, or whether the print job (and likely the entire print line) needs to be halted such that remedial action can take place. For example, if it is determined that the effects of the issue are not relatively large, printing may continue. This may be particularly important in cases where delays in printing are unacceptable. For example, products that spoil, or regulated products may have a limited time in which they can be on a print line. If an issue is detected with a printer, but it is determined that printing can continue, delays on the print line are avoided.

The industrial printer may be any device used for marking in an industrial setting. The industrial printer may comprise any of a continuous inkjet printer, laser marking device, thermal transfer overprinter (TTO), thermal inkjet printer (TIJ), continuous inkjet printer (CIJ), and/or label coding machine.

The data associated with the industrial printer may comprise any suitable data relating to the industrial printer that can be used to determine an issue. For example, the data may be based on the output of sensor data. For example, the data may be based on sensors (internal or external) to the industrial printer. The data associated with the industrial printer may comprise any one or more of the operational status of the printer, the model name/number of the printer, owner of the printer, any configuration data or firmware relating to the printer, service history of the printer, fault or issue history of the printer, reliability of the printer, importance of the print line on which the printer is operating, any print job the printer is associated with, any batch information related to a batch job associated with the printer, sensor data, user set parameter data, printer self-test data, environmental data, etc.

The method may be executed at a server, such as a cloud device. The data associated with the industrial printer may be provided to the cloud device by any suitable computing device. For example, a server located at the site at which the print line is located. An example of such a server is a remote edge server. The data associated with the industrial printer may be provided by a number of different sources. For example, sensor data may be received from a remote edge server, and environmental data may be received from a weather service. Data may alternatively or additional be received via a mobile terminal, such as a mobile phone. For example, a remote technician may provide data to the cloud device using their mobile terminal.

The issue may be any issue that causes, or is likely to cause, a problem. For example, the issue may be that a sensor reading from a sensor measuring a particular parameter associated with the industrial printer is outside of an optimal range.

Determining whether the industrial printer requires remedial action or if the industrial printer can continue to be operated with the issue may also be based on other data, such as the data associated with the industrial printer.

Determining whether the industrial printer requires remedial action or if the industrial printer can continue to be operated with the issue may comprise determining a first score, the first score indicative of an adverse effect on a print quality of the print job caused by the issue and comparing the first score with a first threshold, and if the first score satisfies the first threshold, continue printing, if the first score does not satisfy the first threshold, determine that remedial action is required.

The first threshold may indicate an acceptable quality for the print job. For example, the first threshold may indicate a level at which a mark left on a substrate by the printer with the issue is acceptable or not acceptable. The first threshold may be a default value, may be user set, or may be determined using any suitable means, such as being set by a machine learning model.

Determining whether the industrial printer requires remedial action or if the industrial printer can continue to be operated with the issue may further comprise determining a second score, the second score indicative of an adverse effect to the industrial printer if the industrial printer is continued to be operated with the issue, comparing the second score with a second threshold, and if the second score satisfies the second threshold, continue printing, if the second score does not satisfy the second threshold, determine that remedial action is required.

The second threshold may indicate an acceptable level of risk or damage that may occur with respect to the printer should the industrial printer continue to be operated with the issue. The second threshold may be a default value, may be user set, or may be determined using any suitable means, such as being set by a machine learning model.

Optionally, if both the first score satisfies the first threshold and the second score satisfies the second threshold, it may be determined to continue operating with the issue. If one of the first score or second score does not satisfy the first threshold or second threshold respectively, it may be determined that remedial action is required.

The remedial action may comprise replacement of the industrial printer. Said replacement may comprise identifying a replacement of the industrial printer. Said identification may comprise, identifying a replacement industrial printer from a plurality of replacement industrial printers; said identifying comprising determining a third score for each one of a plurality of replacement industrial printers, said third score indicating a suitability of the industrial printer to be used as a replacement and identifying the replacement industrial printer based on the third scores.

The third scores may be determined based on one or more sub-scores, the one or more sub-scores based on data relating to any one or more of location, age of the industrial printer, service history of the industrial printer, elapsed time since service of the industrial printer, history of use of the industrial printer, operational status of the industrial printer, consumable levels in the industrial printer, reliability of the industrial printer, estimated time to obtain the industrial printer, and/or model number of the industrial printer.

Determining the third score may comprise determining an aggregate of the one or more sub-scores. For example, the one or more sub-scores for a particular printer may be added together (or combined in some other way) to give the third score. An average value of the sub-scores may be determined.

The one or more sub-scores may be weighted by a respective weight. The respective weights for each sub-score may have a default value, may be selected by a user, or may be determined using a machine learning model.

Data relating to location may comprise a location of the replacement industrial printer. The location may comprise any one of a building, facility, workshop, storage area, or another print line. Data relating to location may additionally, or alternatively, comprise a relative distance between a location of the replacement industrial printer and a location of the printer identified as having the issue.

The relative distance may be based on a route between the replacement industrial printer and the printer identified as having the issue. Said route may be based on layout data, e.g. layout of a site, facility or building, and/or map data, such as road networks.

The location data may be determined using a method comprising any one or more of Bluetooth®, RFID, WiFi®, Cellular network, GPS, Zigbee®, video analysis and sound analysis.

The location data may be determined using a triangulation method. For example, the triangulation method is based on any one of a signal strength, fingerprinting, angle of arrival, and time of flight (ToF).

The method may comprise providing a Bluetooth® receiver associated with an industrial printer, distributing one or more Bluetooth® beacons at a print site comprising the print line, the Bluetooth® beacons configured to emit a signal, receiving one or more signals at the Bluetooth® receiver and determining location data associated with the industrial printer based on the one or more received signals. For example, a Bluetooth® receiver may be attached to the industrial printer. Alternatively, the Bluetooth® receiver may be located in a mobile device, and the mobile device may be associated with the industrial printer when brought into proximity with the industrial printer, e.g. when a remote technician is close to the industrial printer.

The method may comprise providing an RFID reader and associating one or more RFID tags with one or more industrial printers, receiving one or more signals at the RFID reader, said one or more signals from an RFID tag and determining location data associated with an industrial printer based on the one or more received signals from the RFID tag. Associating one or more RFID tags may comprise attaching or affixing RFID tags to the industrial printers.

The method may comprise associating a WiFi® transceiver to the one or more industrial printers, and providing one or more WiFi® access points at the print site comprising the print line receiving one or more signals at the WiFi® transceiver, said one or more signals from one or more of the WiFi® access points and determining location data associated with an industrial printer based on the one or more received signals from the WiFi® access points.

The method may comprise recording sound using one or more microphones, said one or more microphones associated with the replacement industrial printer, and determining location data based on the recorded sound.

The method may further comprise generating data associated with the recorded sound, comparing data associated with the sound with a database, said database comprising data associated with sounds of particular locations, and determining a location based on said comparison.

The method may comprise recording one or more images using one or more cameras, said one or more cameras associated with the replacement industrial printer, generating data associated with the recorded image, analysing the data associated with the recorded image and determining a location based on said analysis.

Determining, based on the data associated with the industrial printer, an issue associated with the industrial printer, may comprise, inputting the data associated with the industrial printer into a machine learning model, obtaining an output from the machine learning model and determining the issue based on the output of the machine learning model.

In some examples, multiple machine learning models may be used. For example, a first machine learning model may be used to detect an issue with the industrial printer. A second machine learning model may be used to determine whether the industrial printer requires remedial action or if the industrial printer can continue to be operated with the issue. For example, the second machine learning model may output the first score and/or second score. A third machine learning model may be used to determine the third score.

The machine learning models may be any suitable models, and trained in any suitable way. For example, the machine learning models may comprise neural networks or vector support machines. Training may be supervised or unsupervised. Training data may be based on the received data described above.

In another aspect there is provided a computer implemented method comprising receiving data associated with an industrial printer, determining an issue associated with the industrial printer based on the data, identifying a replacement industrial printer from a plurality of replacement industrial printers, said identifying based on one or more criteria.

Identifying based on one or more criteria may comprise determining a score associated with one or more of the plurality of replacement industrial printers, identifying the replacement industrial printer based on said scores. A machine learning model may be used to identify the replacement industrial printer.

The score may be based on data relating to any one or more of location of the replacement industrial printer, age of the replacement industrial printer, service history of the replacement industrial printer, elapsed time since service of the replacement industrial printer, history of use of the replacement industrial printer, operational status of the replacement industrial printer, consumable levels in the replacement industrial printer, reliability of the replacement industrial printer, estimated time to obtain the replacement industrial printer, and/or model number of the replacement industrial printer. That is, the score may be the third score referred to above, where the score comprises the sub-scores.

The one or more criteria may be based on a location of the replacement industrial printer. The location may be determined based on any of the methods described herein.

In another aspect there is provided a server comprising one or more processors, a non-transitory computer readable medium comprising instructions that when executed by the one or more processors, cause the one or more processors to carry out any of the methods described herein.

In another aspect, there is provided a system comprising one or more industrial printers, one or more replacement industrial printers, a server, the server configured to: receive data associated with the one or more industrial printers, determine an issue associated with one or more of the industrial printers based on the data, identify a replacement industrial printer from the one or more replacement industrial printers, said identifying based on one or more criteria. The one or more criteria may be any of those described above.

In another aspect there is provided a non-transitory computer-readable storage medium having stored thereon instructions which when executed by a processor, cause the processor to perform any of the methods described herein.

In another aspect there is provided a method for determining whether an industrial printer requires remedial action or if the industrial printer can continue to be operated with an issue, the method comprising, receiving, by a processor, data associated with an industrial printer, the industrial printer operating on a print line and executing a print job, determining, by the processor and based on the data associated with the industrial printer, an issue associated with the industrial printer, determining, by the processor and based on the issue, whether the industrial printer requires remedial action or if the industrial printer can continue to be operated with the issue.

Determining whether the industrial printer requires remedial action or if the industrial printer can continue to be operated with the issue may comprise determining, by the processor, a first score, the first score indicative of an adverse effect on a print quality of the print job caused by the issue, comparing, by the processor, the first score with a first threshold, determining, by the processor, whether the first score satisfies the first threshold, and wherein, if it is determined, by the processor, that the first score satisfies the first threshold, determining, by the processor, to continue to operate the industrial printer with the issue, and if it is determined, by the processor, that the first score does not satisfy the first threshold, determining, by the processor, that remedial action is required.

Determining whether the industrial printer requires remedial action or if the industrial printer can continue to be operated with the issue may comprise determining, by the processor, a second score, the second score indicative of an adverse effect to the industrial printer if the industrial printer is continued to be operated with the issue, comparing, by the processor, the second score with a second threshold, determining, by the processor, whether the second score satisfies the second threshold, and wherein, if it is determined, by the processor, that the second score satisfies the second threshold, determining, by the processor, to continue to operate the industrial printer with the issue, and if it is determined, by the processor, that the second score does not satisfy the second threshold, determining, by the processor, that remedial action is required.

Optionally, if both the first score satisfies the first threshold and the second score satisfies the second threshold, the method further comprises determining, by the processor, that the industrial printer can continue to operate with the issue; and if one of the first score or second score does not satisfy the first threshold or second threshold respectively, determining, by the processor, that remedial action is required.

The remedial action may comprise replacement of the industrial printer and identifying the replacement industrial printer may comprise identifying, by the processor, a replacement industrial printer from a plurality of replacement industrial printers; the identifying comprising, determining, by the processor, a third score for each one of a plurality of replacement industrial printers, the third score indicating a suitability of the industrial printer to be used as the replacement, and identifying, by the processor, the replacement industrial printer based on the third scores.

The third scores may be determined based on one or more sub-scores, the one or more sub-scores based on data relating to any one or more of location of the replacement industrial printer, age of the replacement industrial printer, service history of the replacement industrial printer, elapsed time since service of the replacement industrial printer, history of use of the replacement industrial printer, operational status of the replacement industrial printer, consumable levels in the replacement industrial printer, reliability of the replacement industrial printer, estimated time to obtain the replacement industrial printer, and/or model number of the replacement industrial printer.

Determining the third score may comprise determining, by the processor, an aggregate of the one or more sub-scores.

The method may further comprise weighting, by the processor, the one or more sub-scores by a respective weight.

The respective weights may have a default value, may be selected by a user, or may be determined, by the processor, using a machine learning model.

Data relating to the location of the replacement industrial printer may comprise a location of the replacement industrial printer. The location may comprise any one of a building, facility, workshop, storage area, or another print line.

Data relating to the location of the replacement industrial printer may comprise a relative distance between a location of the replacement industrial printer and a location of the printer identified as having the issue.

Determining, by the processor, the data relating to the location of the replacement industrial printer may comprise using any one or more of Bluetooth®, RFID, WiFi®, Cellular network, GPS, Zigbee®, video analysis and sound analysis.

The data relating to the location of the replacement industrial printer may be determined using a triangulation method. The triangulation method may be based on any one of signal strength, fingerprinting, angle of arrival, and time of flight (ToF).

The method may further comprise distributing one or more Bluetooth® beacons at a print site comprising the print line, the Bluetooth® beacons configured to emit a signal, receiving, by a Bluetooth® receiver associated with the replacement industrial printer, one or more signals, and determining, by the processor, the data relating to the location of the replacement industrial printer based on the one or more received signals from the one or more Bluetooth® beacons.

The method may further comprise associating an RFID tag with the replacement industrial printer, receiving, by an RFID reader, one or more signals, the one or more signals from the RFID tag and determining, by the processor, data relating to the location of the replacement industrial printer based on the one or more received signals from the RFID tag. The RFID tag may comprise active or passive RFID tags.

The method may further comprise distributing one or more WiFi® access points at a print site comprising the print line, the one or more WiFi® access points configured to emit a signal, associating a WiFi® transceiver with the replacement industrial printer, receiving, by the WiFi® transceiver, one or more signals, the one or more signals from the one or more of the WiFi® access points, and determining, by the processor, data relating to the location of the replacement industrial printer based on the one or more received signals from the one or more WiFi® access points.

The method may further comprise recording sound using one or more microphones, the one or more microphones associated with the replacement industrial printer, and determining, by the processor, data relating to the location of the replacement industrial printer based on the recorded sound.

The method may further comprise generating, by the processor, data associated with the recorded sound comparing, by the processor, data associated with the sound with a database, the database comprising data associated with sounds of particular locations, and determining, by the processor, data relating to the location of the replacement industrial printer based on the comparison.

The method may further comprise recording, by one or more cameras, one or more images, the one or more cameras associated with the replacement industrial printer, generating, by the processor, data associated with the recorded image, analysing, by the processor, the data associated with the recorded image and determining, by the processor, data relating to the location of the replacement industrial printer based on the analysis.

Determining the issue associated with the industrial printer may comprise inputting, by the processor, the data associated with the industrial printer into a machine learning model, obtaining, by the processor, an output from the machine learning model, and determining, by the processor, the issue based on the output of the machine learning model.

Determining whether the industrial printer requires remedial action or if the industrial printer can continue to be operated with the issue may comprise determining, by the processor, first data indicative of an adverse effect on a print quality of the print job caused by the issue, determining, by the processor and based on the first data, that the industrial printer requires remedial action.

Determining whether the industrial printer requires remedial action or if the industrial printer can continue to be operated with the issue may comprise determining, by the processor, second data indicative of an adverse effect to the industrial printer if the industrial printer is continued to be operated with the issue, determining, by the processor and based on the second data, that the industrial printer requires remedial action.

Determining whether the industrial printer requires remedial action or if the industrial printer can continue to be operated with the issue may comprise determining, by the processor, first data indicative of an adverse effect on a print quality of the print job caused by the issue, determining, by the processor, second data indicative of an adverse effect to the industrial printer if the industrial printer is continued to be operated with the issue, determining, by the processor and based on both of the first data and second data, that the industrial printer requires remedial action.

The remedial action may comprise replacement of the industrial printer, and the method may further comprise identifying, by the processor, a replacement industrial printer from a plurality of replacement industrial printers.

Identifying, by the processor, the replacement industrial printer from the plurality of replacement industrial printers may comprise determining, by the processor, data relating to any one or more of location of the replacement industrial printer, age of the replacement industrial printer, service history of the replacement industrial printer, elapsed time since service of the replacement industrial printer, history of use of the replacement industrial printer, operational status of the replacement industrial printer, consumable levels in the replacement industrial printer, reliability of the replacement industrial printer, estimated time to obtain the replacement industrial printer, and/or model number of the replacement industrial printer.

In another aspect there is provided a method for identifying a replacement industrial printer, the method comprising, receiving, by a processor, data associated with an industrial printer, determining, by the processor, an issue associated with the industrial printer based on the data, and identifying, by the processor, the replacement industrial printer from a plurality of replacement industrial printers, the identifying based on one or more criteria.

Identifying based on one or more criteria may comprise determining, by the processor, a score associated with one or more of the plurality of replacement industrial printers and identifying, by the processor, the replacement industrial printer based on the scores.

The score may be based on data relating to any one or more of location of the replacement industrial printer, age of the replacement industrial printer, service history of the replacement industrial printer, elapsed time since service of the replacement industrial printer, history of use of the replacement industrial printer, operational status of the replacement industrial printer, consumable levels in the replacement industrial printer, reliability of the replacement industrial printer, estimated time to obtain the replacement industrial printer, and/or model number of the replacement industrial printer.

The one or more criteria may be based on a location of the replacement industrial printer.

In another aspect there is provided a server comprising one or more processors, and a non-transitory computer readable medium comprising instructions that when executed by the one or more processors, cause the one or more processors to perform any of the methods described herein.

In another aspect there is provided a system comprising one or more industrial printers, one or more replacement industrial printers, a server comprising a processor, the server configured to receive, at the processor, data associated with the one or more industrial printers, determine, by the processor, an issue associated with one or more of the industrial printers based on the data, identify, by the processor, a replacement industrial printer from the one or more replacement industrial printers, the identifying based on one or more criteria.

In another aspect there is provided a non-transitory computer-readable storage medium having stored thereon instructions which, when executed by a processor, cause the processor to perform any of the methods described herein.

It will be understood that optional features of one aspect may be combined with another aspect.

Embodiments of the invention will now be described, by way of example, with reference to the accompanying drawings, in which.

Figure 1:
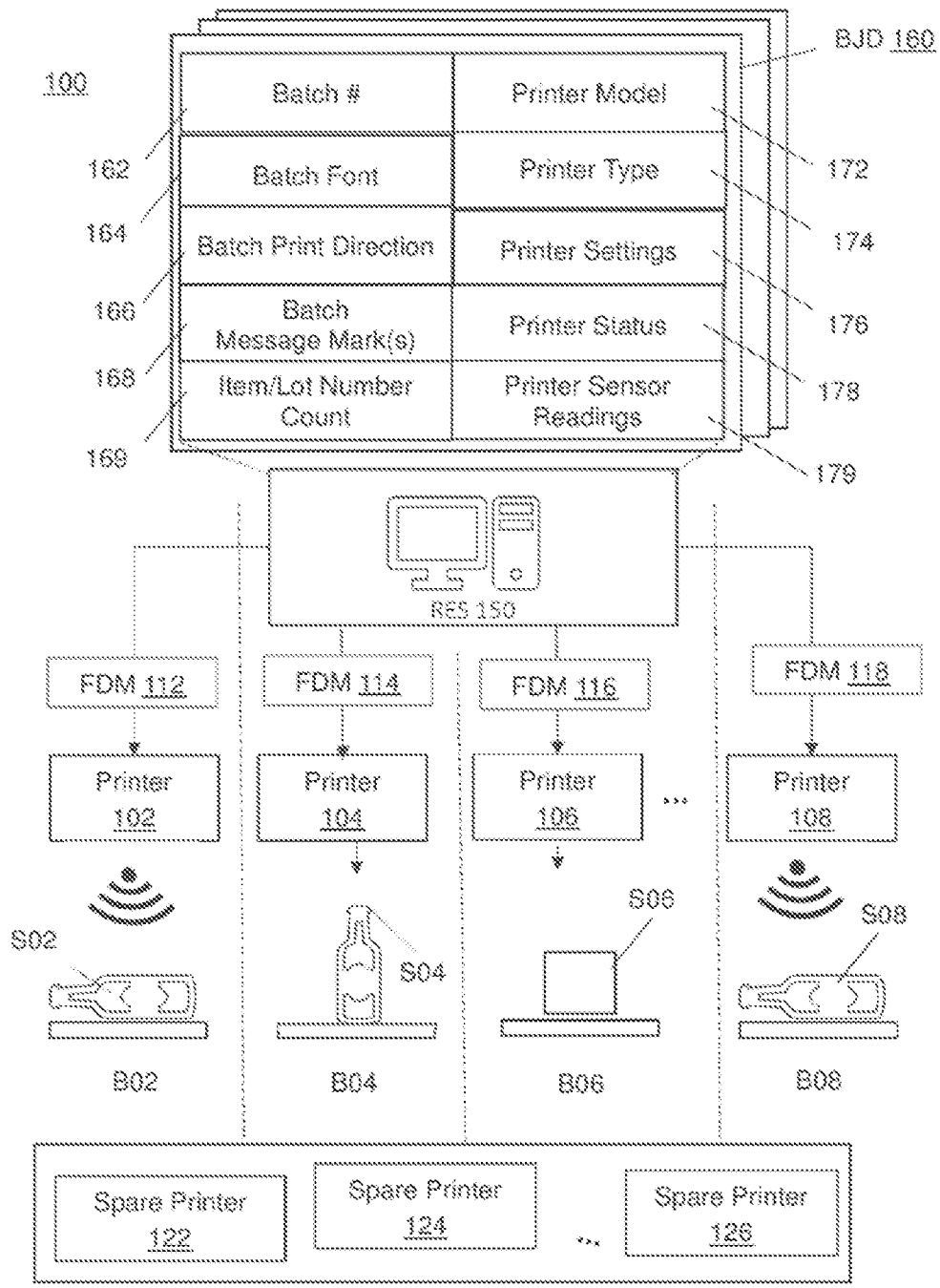
FIG. 1 illustrates a block diagram of a system for detecting an issue with an industrial printer.

FIG. 1 illustrates a block diagram of a system 100, such as a collection of industrial printers, for marking substrates. The system 100 may include a remote edge server (RES) 150 and one or more industrial printers 102, 104, 106, and 108 in wired or wireless communication with the RES 150. The RES may be a network computing device placed at a customer site (e.g. a print site at which the industrial printers are located) for collecting and transferring printer data from one or more printers to a cloud device 280 (see FIG. 8). While not shown in FIG. 1, the cloud device 280 may be part of the system 100. The cloud device 280 may provide a remote monitoring service (RMS) platform. U.S. Pat. No. 9,524,132 describes an example of a remote monitoring service (RMS) platform to aid in repairing and/or maintaining a printer remotely, by way of non-limiting example. The cloud device 280 may be configured to receive printer data (and any other relevant data) from the RMS 150 and may be configured to determine one or more actions with respect to the printer data.

As can be appreciated, a site may have different types of printers to apply various types of markings on a variety of substrates S02, S04, S06, S06 and S08. The substrates S02 and S08 may be the same substrate but being marked by different printers. Substrate S04 may be a bottle cap type. Substrate S06 may be a paper product type substrate. This list of substrates is not meant to be limiting in any way. Substrates may include non-porous or porous substrates, plastic, paper, foil, cardboard, glass, metal, or other materials.

The printers 102, 104, 106, and 108 may be any type of industrial printer, such as an inkjet printer, continuous inkjet (CIJ) printer, a laser marking device, thermal transfer printer, by way of non-limiting examples. Assume that printer 102 marks batch B02; printer 104 marks batch B04; printer 106 marks batch B06; and printer 108 marks batch B08. Each batch may be different requiring each different printer to be programmed with a different set of batch instructions or data.

Figure 8:
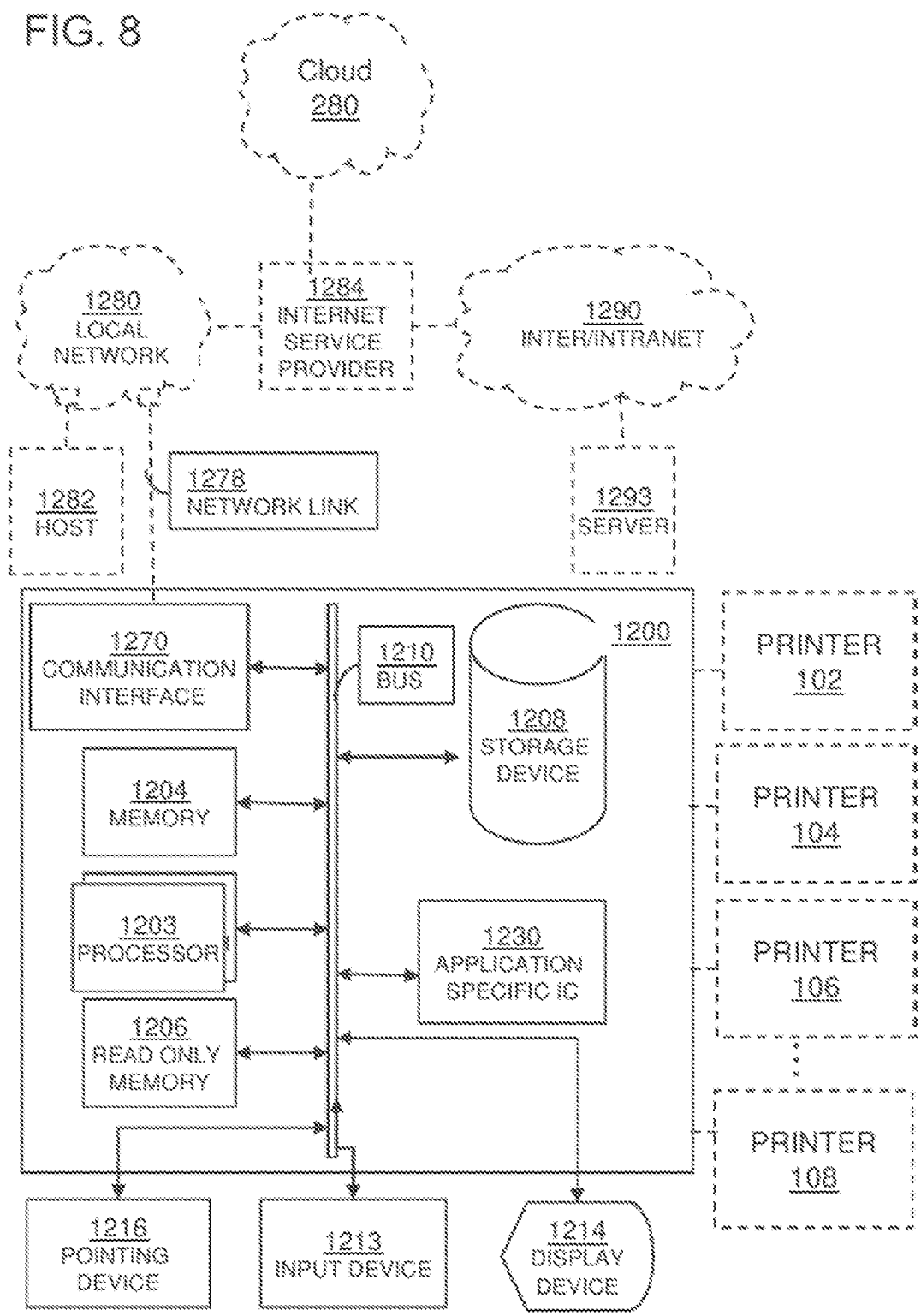
FIG. 8 illustrates a block diagram of a computing system.

The RES 150 may include a batch job database (BJD) 160 stored in a memory device (FIG. 8). The BJD 160 may comprise any suitable data relating to printing a batch job. For example, the BJD 160 may include data representative of one or more of a batch number 162, batch font(s) 164, batch print direction 166, batch message mark(s) 168 and item/lot number count 169. The BJD 160 may include data representative of one or more of printer model 172, printer type 174, printer settings 176, printer status 178 and printer sensor readings 179. While the BJD 160 is shown as being at the RES 150, the BJD 160 may be located in the cloud device 280, or may be replicated in the cloud device 280. It will be understood that in some examples, the batch job may contain information to control more than one printer, and/or the batch job may comprise multiple print jobs. Different printers (such as printer 104 and printer 106) may each be instructed to print for a given batch, but the print job IDs for each printer may be different.

The system 100 may include one or more fault detection monitors (FDM) 112, 114, 116, and 118. The FDM is configured to determine a fault or issue of a printer based on one or more internal sensors within the printer or other status indicators. It will be appreciated that the fault detection monitors may be implemented in software located on the printers, located at the RES 150, located on a further computing device connected to the printers, or located in the cloud device 280. When an issue or fault is detected by the FDM, the FDM may send a notification (including any relevant data) to the RES 150 and/or to the cloud device 280. If sent to the RES 150, the RES 150 may forward on to the cloud device 280. While each printer is shown having its own FDM 112, 114, 116, 118, it will be appreciated that multiple printers may share an FDM.

The system 100 may include one or more spare printers 122, 124, and 126 (spare printers are sometimes referred to as replacement printers within this disclosure). The spare printers 122, 124 and 126 may be located on site, such as in a spare repository or in a workshop. Alternatively, the spare printers may be located on another print line. That is, as described in further detail below, a spare printer that is selected to replace a faulty printer may be a printer that is currently active on another print line. In another example, the spare printers may be located at a remote site. That is a site located at a different geographical location (e.g. a different building or facility) to that of the site comprising printers 102-108. Data relating to the spare printers 122, 124, and 126, such as their location or operational status, may be stored in the cloud device 280, where said data may be forwarded to the cloud by the RES 150, or any other computer device.

During operation, printers may be configured to be monitored by internal (or external) sensors to determine the health and status of the printers. The RES 150 may be configured to receive and track sensor data (not shown) from the printers, and/or user set parameter data, as disclosed for example in U.S. Pat. No. 9,524,132, titled "SYSTEM AND METHOD FOR REMOTELY SERVICING AN INDUSTRIAL PRINTER," issued on Dec. 20, 2016 and assigned to Videojet Technologies, Inc, and which is incorporated by reference. Printers may include various sensors which monitor one or more components of the printer. For example, in some embodiments, a nozzle component has a temperature sensor, a jet velocity sensor, a pressure sensor, a modulation voltage sensor, a modulation current sensor and a modulation frequency sensor. Other example components and associated sensors for a continuous inkjet printer are possible. Some sensors are used to track quantities of printer consumables, such as, by way of non-limiting example, ink and solvents.

There may be various sensors for various components of the printer, such as in the printhead, ink system, consumables, and electronics of the printer. These sensors provide information on parameters related to the corresponding component. The combined information from the various sensors from various components provide unprecedented amounts of information on the status of various systems in the printer to allow a remote user to diagnose and/or predict potential issues, such as faults, warning, or failures, with the printer. The printhead may include a nozzle having sensor parameters such as the modulation voltage setpoint, modulation current, frequency, temperature, jet velocity setpoint, actual velocity, target pressure, temperature-compensated target pressure, and actual pressure; phase sensor parameters including selected phase, phase rate of change, profile, and phase threshold; EHT parameters such as voltage, current, trip value, and % of trip; gutter parameters such as build up, time since last clean, warning level setting, and presence of ink in gutter; printhead heater parameters such as set temperature, actual temperature, and drive; printhead cover parameters such as status (on or off) and time since last removed; the status of various printhead valves (open, closed, and time open or closed); nozzle parameters such as nozzle size, target velocity, serial number, manufacture date, drop frequency, print count, run hours, and drops deflected.

The ink system may include sensor parameters such as ink pump parameters such as pressure, speed, current, and pump run hours; ink reservoir parameters such as ink type, ink expiry date, fluid level (ml and/or %), print hours remaining, and ink tank temperature; make up reservoir parameters such as make up type, expiry date, makeup vacuum, fluid level (ml and/or %), print hours remaining, and makeup tank temp; viscometer parameters such as target time to empty, actual time to empty, density, viscosity, and fill time; ink quality parameters such as ink conductivity; condenser parameters such as status (on or off), temperature, and vent valve (on or off); filter/damper module parameters such as ink filter pressure drop, serial number, manufacture date, run hours, and replacement date; service module parameters such as flush pump speed, flush pump current, serial number, manufacture date, run hours, replacement date, and information for various service module valves (open, closed, and time open or closed); ink cartridge parameters such as ink type, recommended make up type, serial number, manufacture date, expiry date, cartridge size, fluid level, run elapsed time, time to cartridge replacement, number of cartridge insertions, viscosity coefficient(s), fluid density, modulation algorithm numbers, and cold start algorithm numbers; make up cartridge parameters such as makeup type, serial number, manufacture date, expiry date, cartridge size, fluid level, run elapsed time, time to cartridge replacement, and number of insertions. Other printer parameters include air filter parameters such as date last replaced, run hours, and replacement date; fume/gas sensors within the printer cabinet; humidity sensors within the printer or for ambient measurement; main control board parameters such as time and date, electronics temperature, HV voltage, HV Current, and the voltage of various other power supplies within the electronics.

Of course, the above parameters are merely examples at it will be appreciated that any printer parameters may be used.

Figure 2:
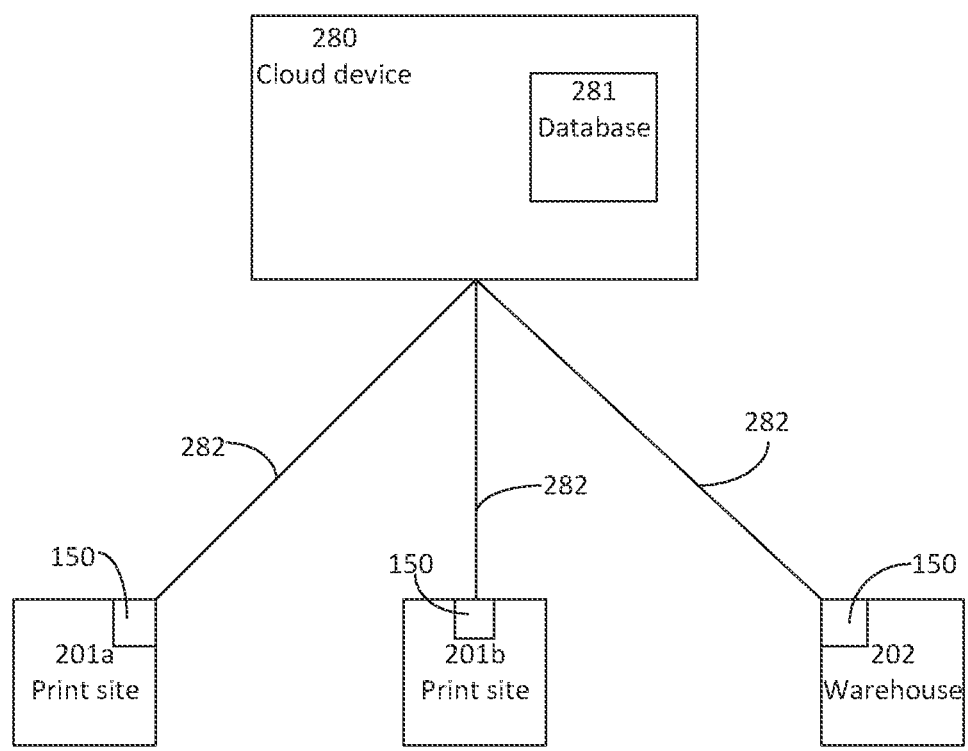
FIG. 2 illustrates a block diagram of a number of sites connected to a cloud device.

FIG. 2 illustrates a block diagram of multiple sites 201a, 201b, 202, connected to cloud device 280. Some of the sites may be print sites and some may be warehouses.

Other types of sites are possible. Site 202 may be a warehouse storing any of industrial printers, parts or components for industrial printers, and consumables such as ink. Sites 201a, 201b may be print sites as shown in FIG. 1. That is, sites 201a, 201b may comprise a number of industrial printers, and one or more print lines. One or more of the sites 201a, 201b, 202 may be geographically located at different locations relative to one another, e.g. in different buildings, towns or cities. While three sites 201a, 201b, 202 are shown, it will be appreciated that any number of sites may be present.

The sites 200 may each have a RES 150 (or other computer device) which connects to the cloud device 280 via network 282. Network 282 may be any suitable network using any suitable telecommunications technology. The cloud device 280 comprises, or is connected to, a database 281. The cloud device 280 may connect to the database 281 using any suitable means. For example, the database 281 may be stored in storage of the cloud device 280. The database 281 may be remote from the cloud device 280, and the may be accessible to the cloud device via any suitable connection means, such as the internet. The database 281 may store printer data relating to one or more industrial printers, and/or any other data relevant to the printers (either operational printers or spare printers). The printer data is received, for example, from the RES 150 or other computer device. While all sites 201a, 201b, 202 are shown as comprising a RES 150, it will be appreciated that some sites may not have a RES 150 (such as warehouse 202). In such cases, data relating to the printers stored at the warehouse 202 may be provided to the cloud device 280 by another computer device, such as a mobile device of a remote technician, or by a RES 150 located at an alternative site 201a, 201b. For example, a RES 150 at site 201b may be provided with data relating to printers stored at warehouse 202. The RES 150 may then upload said data to the cloud device 280.

The system 100 allows data relating to numerous printers to be collected and stored. As described above, the cloud device 280 may receive data relating to printers from numerous RESs, each RES located at a different site. The data may also include environmental data, such as the environmental conditions (e.g. temperature, pressure, humidity, etc.) experienced by the printers at their locations. Environmental conditions may be obtained from the RESs, or may be obtained from an alternative source. For example, the RESs may obtain environmental readings of its environment, and send these to the cloud device 280. In another example, the cloud device 280 may determine the location of a printer, or RES, and may query environmental conditions based on that location, such as from a weather reporting service.

The database 281 may take any suitable form for recording data relating to the printers. For example, the database 281 may store entries for each printer, and for each printer, store relevant data associated with said printer. Relevant data may be any suitable information relating to the printer, e.g. printer data. Examples of relevant information comprise any of the data describe herein. For example, the data relating to the location of the printer, some or all of the information contained in the BJD 160 which is associated with the printer, the operational status of the printer, the model name/number of the printer, owner of the printer, any configuration data or firmware relating to the printer, service history of the printer, fault or issue history of the printer, reliability of the printer, importance of the print line on which the printer is operating (if any), any print job the printer is associated with, sensor data, and user set parameter data may be stored in the database 281. Any other information related to the printer may also be stored in the database 281. For example, the database 281 may store all or some of the sensor data recorded by the one or more sensors at, or associated with, the printer. The database 281 may also store historic data. That is, the database may maintain a history for each printer, the history comprising some or all of the previously received data relating to the printer. The database may store logs of data for the printers. The logs may comprise, for example, sensor readouts as a function of time for the printers. The logs may also comprise any other information received relating to the printer and/or its environment.

Data relating to the location of the printer may be any suitable information relating to location. The location may be relative to any suitable coordinate system. For example, the location may be geographic, i.e. the real world location of the printer, or the site in which the printer is located. The location may be relative to the site in which the printer is located, e.g. that the printer is located on a particular print line, is in a workshop for repair, is on shelf in a storage area, etc. Further details regarding determining location are described below.

Data relating to the operational status of the printer may indicate any information suitable for determining the operational status of a printer. Examples of such data are that the printer is currently in use, not currently in use, operating within optimal parameters, operating outside of optimal parameters, not currently in use but in working order, not currently in use and out of order. The operational status may also include information associated with consumables, such as ink levels associated with the printer.

Data relating to the reliability of the printer may be based on analysis of historic data. For example, by reviewing data accumulated in the database 281 at the cloud device 280, it may be determined that some printers are more reliable than others. It may also be determined that some printers are more reliable than others for particular tasks, or when operating in particular environmental conditions.

The database 281 may store user set parameters. That is, parameters of the print job that can be set by a user. The user set parameters may relate to the printer, or the print job. Examples of user set parameters are given in U.S. Pat. No. 9,524,132B2.

The data at the database 281 may be regularly updated. For example, RES 150 may periodically send data to the cloud device 280 relating to the printers. The RES may additionally, or alternatively, send data to the cloud device 280 when a change occurs. Such changes may be, for example, new print jobs, new printers installed on a print line, printers removed from a print line, etc. If the FDM is located client side (e.g. at the site), the RES 150 may additionally (or alternatively) send data to the cloud device 280 if an issue is detected by the FDM. Alternatively or additionally, the cloud device 280 may query, either periodic or otherwise, the RES 150 to send updated data.

Having access to vast quantities of data from multiple printers has numerous advantages. For example, the data stored in the database 281 may be used to assist in selecting an appropriate printer for a particular task (e.g. selection of a spare printer if there is an issue with a printer on a print line) as described in more detail below. In another example, trends in the data may be correlated with issues with printers, such that future issues may be predicted. Some or all of the data within the databased may be used as training data to train a machine learning model. For example, the data may be used to train a machine learning model such that the machine learning model can be used to predict potential issues, such as printer failures. For example, the machine learning model may output a probability of an issue developing on a given printer. If the output of a trained machine learning model indicates that there is a high probability of an issue developing, a notification may be generated to alert the user of the printer (or any suitable person, such as a remote technician) that an issue is likely with the given printer.

As mentioned above, some of the data relating to the printers may relate to a location of the printer. Industrial printers of the prior art do not have built in location obtaining means, e.g. built in GPS. The present disclosure provides a number of ways in which the location of a printer (or spare printer) may be determined, including using Bluetooth® (such as Bluetooth® receivers and beacons), (NFC) RFID tags (active or passive) and readers, WiFi® triangulation, cellular triangulation, GPS, ZigBee®, cameras, and/or microphones.

Figure 3:
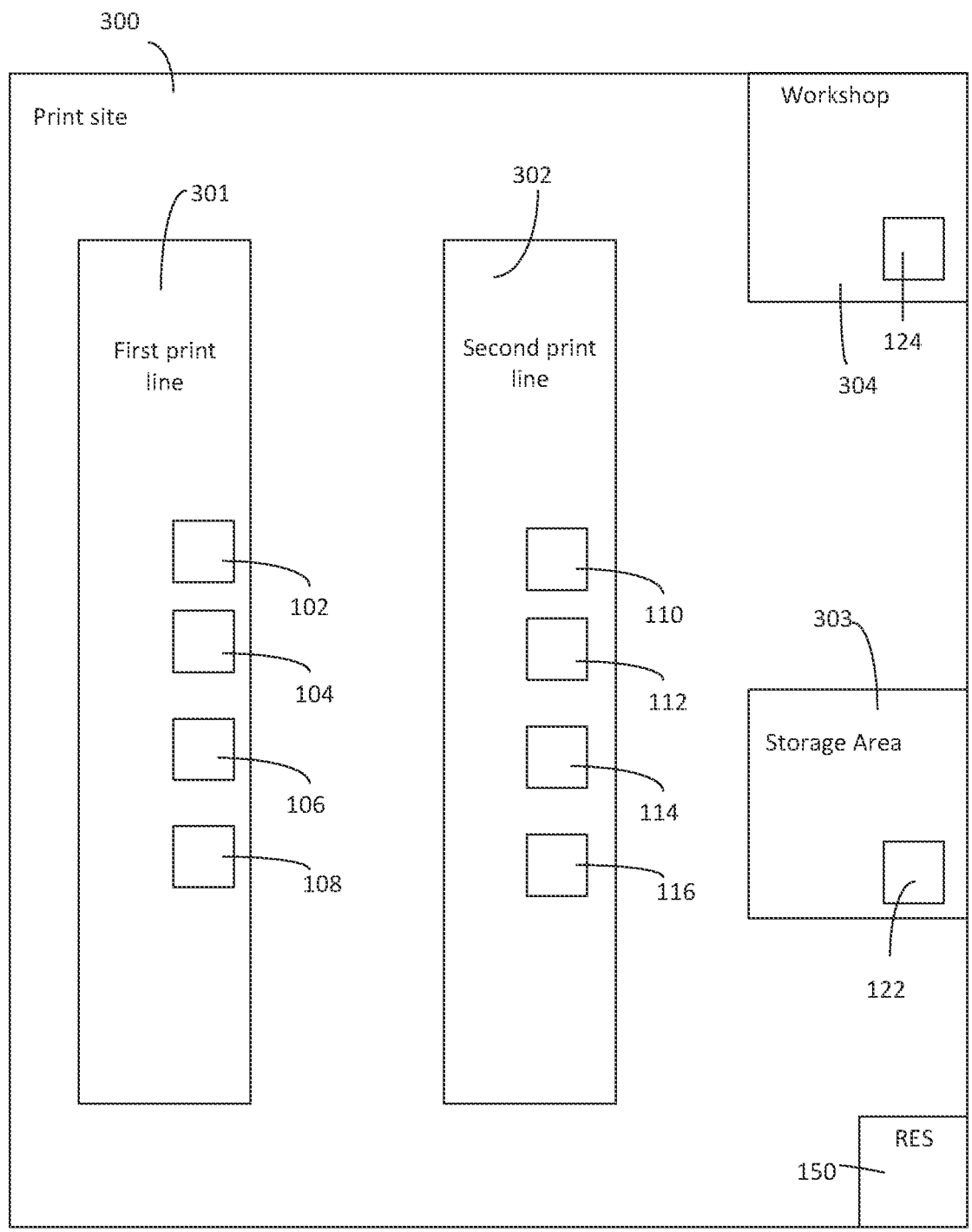
FIG. 3 illustrates a schematic representation of a print site.

FIG. 3 illustrates a block diagram of a print site 300. The print site 300 may comprise the system 100 shown in FIG. 1, and may be the same as print sites 201a, 201b as shown in FIG. 2. The print site 300 comprises a first print line 301, second print line 302, storage area 303, workshop 304 and RES 150. The first and second print lines 301, 302 may be set up as separate print lines for marking different products, or marking different information on the products. Having multiple print lines provides numerous advantages, such as being able to increase marking throughput when operated in parallel. Alternatively, different print lines can be assign different tasks, e.g. marking different products. Some print lines may be not be operated, and only used if required, e.g. to increase marking capacity.

The first print line 301 comprises multiple industrial printers such as printers 102-108. The first print line 301 may be configured to mark one or more substrates such as S02-S08 of one or more objects (not shown in FIG. 3). The second print line 302 comprises multiple printers such as printers 110, 112, 114, 116 configured to mark one or more other substrates. In this specific example, the second print line 302 is configured to mark a different product from those marked on the first print line 301.

The storage area 303 comprise one or more spare printers 122. Storage 303 may be a storage area at the print site 300 in which unused spare printers 122 may be stored. While only one spare printer 122 is shown, it will be appreciated that any number of spare printers 122 may be stored in the storage area 303.

The workshop 304 may be an onsite workshop where defective industrial printers may be repaired, or where printers may be serviced. In the example of FIG. 3, a spare printer 124 is located in the workshop 304. Of course, it will be understood that, in some cases, printers may be repaired or serviced on their print line 301, 302, or in the storage area 303. As can be seen in FIG. 3, individual printers may be located in a variety of different places, e.g. particular position on a print line, in the storage area, in the workshop 304, etc. The present disclosure provides a method which can be used to determine and track the location of industrial printers.

Figure 4:
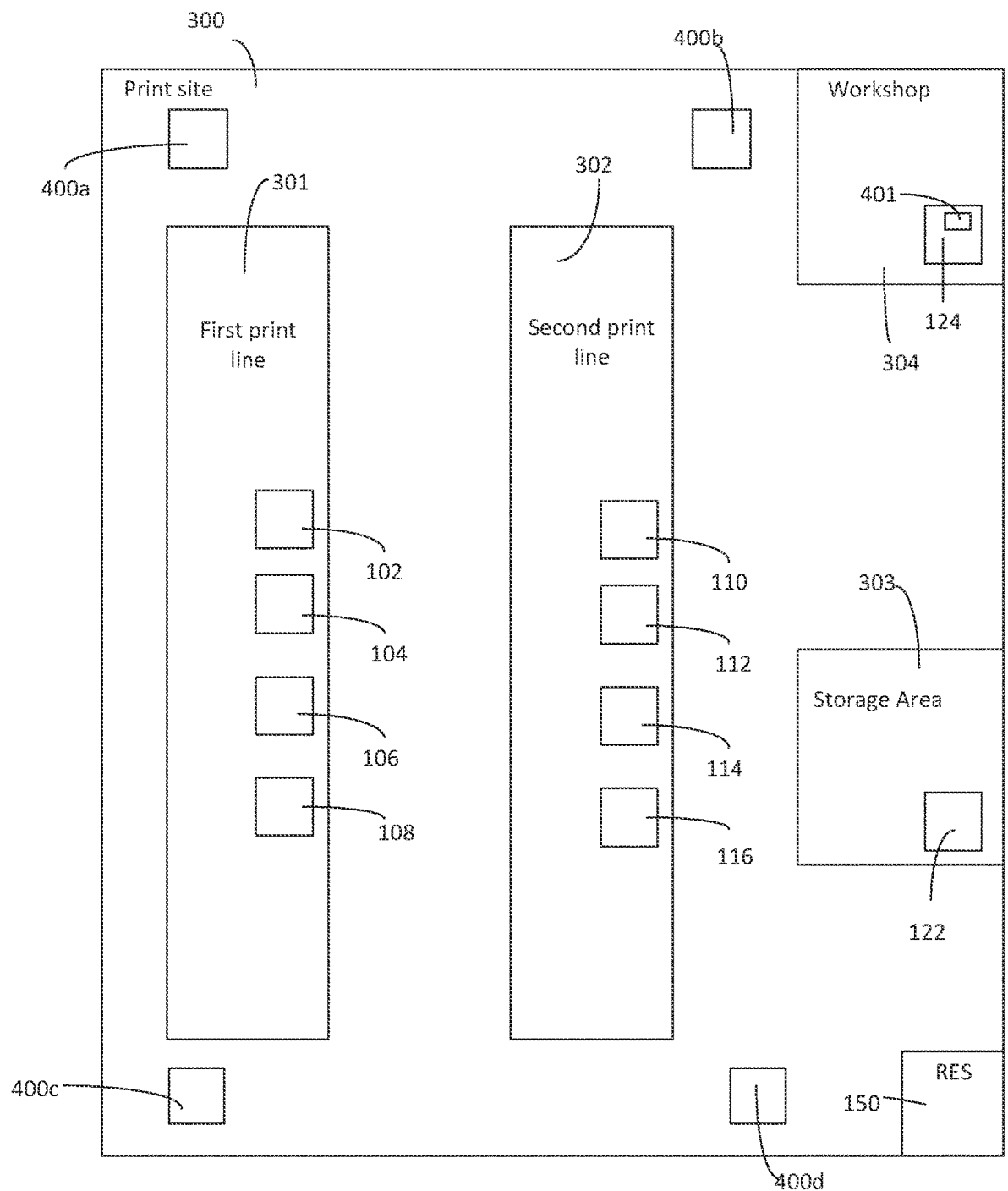
FIG. 4 illustrates a further schematic representation of a print site.

FIG. 4 illustrates a block diagram of the print site 300, where Bluetooth® beacons 400 have been installed at one or more positions within the site 300. FIG. 4 shows four Bluetooth® beacons 400, however it will be appreciated that any number of beacons may be used.

In an example, each printer that is to be tracked is provided with a Bluetooth® receiver 401. Only one printer 124 is shown with a Bluetooth® receiver 401 in FIG. 4 for clarity, but it will be understood that any number of printers, including all printers, may comprise a Bluetooth® receiver 401. Alternatively, or additionally, a Bluetooth® receiver 401 may be provided in a mobile device, such as a mobile or cellular phone, such that a user can move around the site, their location tracked as described below, and record the location of individual printers.

Each Bluetooth® beacon 400 may periodically emit a radio signal which, if received by the Bluetooth® receiver 401, can be analysed to determine the relative position of the Bluetooth® receiver 401 relative to the beacon 400. Multiple Bluetooth® beacons 400 may be used to triangulate the position of the Bluetooth® receiver 401. For example, consider the case where Bluetooth® receiver 401 receives a radio signal emitted by beacons 400a, 400b and 400d. Each signal 400a, 400b and 400d may be distinguishable as being from a particular beacon. For example, each emitted signal may identify the beacon which emitted the signal. Based on properties of the signal received at the receiver 401, such as the signal strength of the signal received from each beacon 400, a triangulation method may be used to determine the relative location of the receiver 401 to the beacons 400a, 400b and 400d.

Either the Bluetooth® beacons 400, the receiver 401, or both may be in wired or wireless communication with the RES 150. The receiver 401, may send data indicating the determined relative position of the receiver 401 to the RES 150. The RES 150 may have access to a database storing the position of each beacon 400 relative to the site 300. As such, the RES 150 can use the received data to determine the location of the receiver 401 relative to the site 400.

Alternatively, if the receiver 401 is connected to a computer device such as a mobile phone, the mobile phone may make the determination of its position relative to the site. For example, the mobile phone may have access to the location of the beacons 400, and as such, is able to determine its relative location in the site 300, based on a determination of the relative position to the beacons 400. A user, or autonomous user, may then move around the site 300, recording the position of each printer. For example, the mobile device may capture data identifying a printer (such as scanning a QR code on the printer), and at the same time, capture the location of the mobile phone based on the signal received from the Bluetooth® beacons 400. In this way, an estimate of the position of each printer may be determined. The mobile device may be in communication with the RES 150 such that information relating to the location of a printer may be sent to the RES 150.

Once the position of a receiver 401 is determined, it may be helpful to convert the position 401 into a different coordinate system. The coordinate system may be any suitable coordinate system, such as global coordinates or coordinates relative to a site plan of the site 300. For example, if it is known where all beacons are located relative to a position in the site 300, the relative location of the receiver 401 may be mapped to a location within the site 300. The position of the receiver 401 may then be converted to a global coordinate system, such as latitude and longitude. For example, the latitude and longitude of a particular point in the site may be known. As such, the latitude and longitude of the receiver 401 may be determined.

In an alternative method, the position of an industrial printer may be determined based on RFID technology. For example, the receiver 401 may be an RFID tag which can be read by an RFID reader. One or more of the industrial printers may comprise an RFID tag (either active or passive), and an RFID reader may be used to determine location information.

The receiver 401 may be an active RFID tag. Active RFID tags comprise an internal power source, such as a battery, and are able to transmit a radio signal using its own power source. An active RFID tag may continuously broadcast a radio signal, identifying the RFID tag, and which can be picked up by one or more RFID readers.

For example, multiple RFID readers may be located about the site 300 in a similar way to beacons 400. The received signal at each RFID reader may be used to determine a location of the RFID tag emitting the radio signal, such as using triangulation methods.

In another example, the tags 401 are passive RFID tags. A passive RFID tag does not comprise its own internal power source, but is instead powered by a received radio signal transmitted by an RFID reader. That is, when an RFID reader emits a radio signal within range of a passive RFID tag, the received radio signal causes the RFID tag to emit a radio signal in response. For example, a user, or an automated system, may physically move an RFID reader about the site 300 to scan the RFID tags of the printers in order to identify the printers. The RFID reader (or user using the RFID reader) may know its position relative to the site 300 using any suitable method, and so can determine the location of an RFID tag that is scanned. For example, a user may know that they are in the workshop 304 when they scan an RFID tag of a printer within the workshop 304. Said printer can then be listed as being in the workshop.

Other methods are possible. For example, WiFi® triangulation, where the beacons 400 may be replaced with WiFi® access points, and the receiver 401 may be a WiFi® transceiver. Alternatively, cellular triangulation may be used, where the receiver 401 connects to one or more telecommunication network access points (such as cell phone towers), which may be located outside of the site 300. Alternatively, GPS may be used. For example, the receiver 401 may be a GPS receiver capable of interaction with GPS satellites so as to determine a position.

In another example, the Zigbee® standard may be used, or any other wireless mesh network standard.

While examples have been described based on signal strength (e.g. received signal strength indication (RSSI)), other methods are possible, such as fingerprinting, angle of arrival (AoA) and time of flight (ToF) based techniques.

In another example, cameras may be used. For example, a number of cameras may be placed around the site 300. The cameras may record different scenes within the site. Identification means may be applied to one or more printers. For example, printer identification may be marked on the printers, or a visual beacon applied to the printers which can be used to identify printers. Analysis of camera data from the one or more cameras may be used to identify printers in the camera data. Once identified, the position of the identified printer may be determined, based on data relating to the camera, such as the pose of the camera (e.g. which way the camera is pointing). Processing of the camera images may be carried out at any suitable computing device, such as the RES 150 or the cloud device 280.

In another example, a microphone may be used to identify a location. For example, the receiver 401 may comprise a microphone. The microphone may be configured to pick up ambient sound. The received sound may be processed, either at the RES 150 or other suitable processing hardware such as the cloud device 280. The processing may comprise comparing the received sound with a database of sounds relating to particular locations. For example, the sound of a workshop may sound different to the sound of a print line. In an example, a fingerprint of the received sound may be generated and compared with fingerprints in the database, fingerprints in the database being fingerprints of sounds recorded in different locations. If the fingerprint from microphone 401 matches an entry in the database, the location can be determined.

When a printer's location is determined using any method above, location data may be sent to the cloud device 280, and may then be stored in the database 281. In this way, the location of the printers may be recorded and tracked over time. Any combination of the above methods may be used to record and track the location of the printers.

There is now described a method of detecting an issue with an industrial printer. When an issue is detected, the system 100 may make a determination as to whether a printer needs remedial action or if the printer can continue to operate, albeit sub-optimally.

As described above, the cloud device 280 receives data associated with the industrial printers. Based on the data, which could be data from one or more FDMs, the cloud device 280 may determine an issue with a printer. For example, based on the sensor data, an output from an FDM, and/or any other data relating to the printer, such as service interval data, the cloud device 280 may determine that there is an issue with a particular printer operating on a print line and carrying out a print job. The issue may be that the industrial printer is operating outside of optimal parameters. The cloud device 280 may then make a determination as to whether the industrial printer requires immediate remedial action (e.g. such that the print line needs to be halted) or if the industrial printer can continue to be operated with the issue, even if the result of the print job is sub-optimal.

In order to determine whether remedial action is required, or if the printer can continue to be operated, the cloud device 280 may determine a first score, the first score indicative of an adverse effect on a print quality of the print job caused by the issue. The score may take a numerical value. The score may take a value between an upper and lower limit. For example, the score may be between 0 and 100. A score of 0 may indicate that that print quality will be greatly affected by the issue, and a score of 100 may indicate that the print quality will not be greatly affected by the issue.

The cloud device 280 may compare the first score with a first threshold. If the first score satisfies the first threshold, the cloud device may decide to continue printing. If the first score does not satisfy the first threshold, the cloud device may decide that remedial action is required. The first threshold may take a numerical value. The value may be a value between the same upper and lower bound as the first score. For example, the first threshold may be set at 75. If the first score is 80, indicating that the print quality of the print job is not likely to be adversely affected by the issue, the cloud device 280 determines that the print job should continue. If, however, the first score is indicating that the print quality of the print job is likely to be adversely affected by the issue, the cloud device 280 determines that the print job should be halted and remedial action take place.

The cloud device 280 may determine other, or alternative scores, when determining whether the print job should continue. The cloud device 280 may determine a second score, the second score indicative of the risk of damage to the printer if the printer is continued to be operated with the issue. The score may take a numerical value. The score may take a value between an upper and lower limit. For example, the second score may be between 0 and 100. A score of 0 may indicate that that the risk to the printer is extremely high, and a score of 100 may indicate that the risk to the printer is negligible.

The cloud device 280 may compare the second score with a second threshold. If the second score satisfies the second threshold, the cloud device 280 may decide to continue printing. If the second score does not satisfy the second threshold, the cloud device 280 may decide that remedial action is required. The second threshold may take a numerical value. The value may be a value between the same upper and lower bound as the second score. For example, the second threshold may be set at 90. If the second score is 95, indicating that the printer is likely not to be damaged by continuing to print, the cloud device 280 determines that the print job should continue. If, however, the second score is 50, indicating that the printer may sustain damage by continuing to print, the cloud device 280 determines that the print job should be halted and remedial action take place.

The decision whether to halt or continue printing may be based on a combination of both scores and both thresholds. For example, if just one of the scores does not satisfy its respective threshold, printing may be stopped.

The thresholds may have a default value or may be user defined. For example, if what is being printed is not so important, the user may lower the first threshold, as a greater print quality may not be required. If print quality is important, the user may raise the first threshold. Similarly, if the print job is important or urgent, such that a hold up is to be avoided at all costs, the user may raise the second threshold. That is, a user may decide that risk to the printer being damaged is an acceptable cost given the importance or urgency of the print job.

In other examples, the first and second scores may be combined (such as by taking an average) and compared to a single threshold. The first and second scores may be weighted, such that more weight may be attributed to either the first or second scores. The user may define the weighting. For example, a user may choose to weight the second score more than the first score.

Other scores and thresholds may be used, either alone or in combination with those described above. For example, the score may indicate the importance of the printer to the print job. For example, multiple printers may be used on a print line, and some printers may be more important that other printers. Another example of a score that can be used is an indication of the estimated length of time taken to replace or repair the printer.

The scores may be regularly updated. For example, if an issue worsens over time, the scores may be lowered. The scores may take into account the present situation, and/or a future situation. For example, the cloud device 280 may determine that the detected issue is unlikely to affect printing within the next period of time (such as the next hour).

The cloud device 280 may determine how long is left on a particular print job. If the time remaining on the print job is less than the time in which the issue is unlikely to affect printing, the score may be determined to be relatively high.

Figure 5:
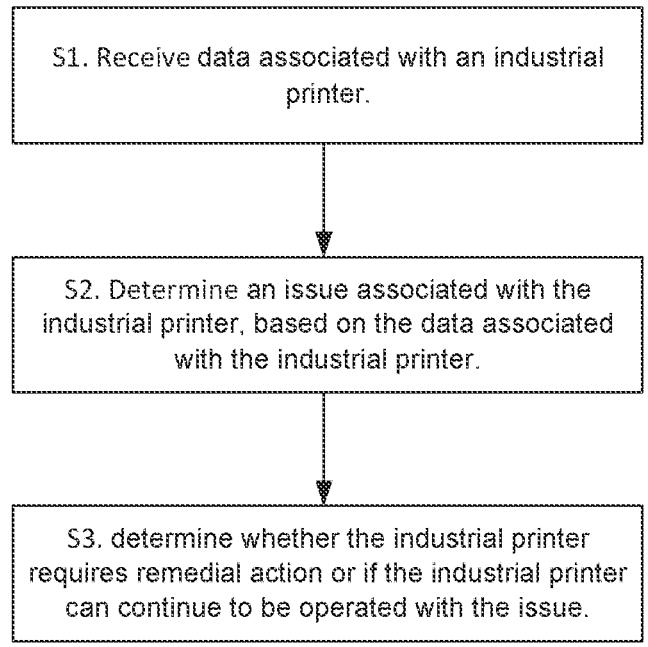
FIG. 5 illustrates a method disclosed herein.

FIG. 5 shows steps according to a method of detecting an issue with an industrial printer.

At step S1, data associated with an industrial printer is received, the industrial printer operating on a print line and carrying out a print job.

At step S2, an issue associated with the industrial printer determined, based on the data associated with the industrial printer.

At step S3, it is determined, based on the issue, whether the industrial printer requires remedial action or if the industrial printer can continue to be operated with the issue.

In order to illustrate the above method, we provide the following specific example.

In this specific example, the first print line 301 shown in FIG. 3 is configured to mark information on a bottle. Printer 102 is configured to mark substrate S02 and printer 104 is configured to mark substrate S04. Substrate S02 may be a label on the bottle, and printer 102 may be a CIJ. Substrate S04 may be a bottle top on the bottle, and printer 104 may be a laser printer. Unmarked bottles may be transported by conveyor past printers 102 and 104, where printers 102, 104 mark their respective substrates S02, S04. Data from sensors at the printers is sent to and received by the RES 150, and from the RES 150 sent to the cloud device 280. The RES 150 may also send other data relating to the printers to the cloud device 280, such as information contained in the BJD 160.

Based on the data received at the RES 150, an issue is detected with printer 102. The issue may be any issue that could affect the printing operation performed by the printer 102. In this specific example, the issue is a determination that a temperature reading from a nozzle component of printer 102 exceeds an optimal range.

It is determined that the print quality on substrate S02 by printer 102 is not likely to be adversely affected by the slight increase in temperature of the nozzle component. For example, it may be determined that the mark left by the printer 102 is still likely to be legible. Said determination may be based on any suitable information. For example, a database (either part of database 281 or separate) may comprise information relating to issues, and their likely effects. Alternatively, a machine learning model may be used that has been trained to generate scores indicative of an adverse effect on a print quality of the print job caused by the issue. In this specific example, assume that the score indicative of an adverse effect on a print quality of the print job caused by the issue (e.g. the first score) is calculated to be 80.

It may also be determined that the temperature reading from the nozzle component, while slightly higher than optimum, is likely not due to cause any significant damage to the printer 102 if the printer 102 is continued to be operated. In this specific example, assume that the score indicative of an adverse effect to the industrial printer if the industrial printer is continued to be operated with the issue (e.g. the second score) is calculated to be 90.

The first score (e.g. 80) is compared against the first threshold. In this example, the user has set the first threshold low, at 30, as the legibility of the mark is not as important. In this case, the first score satisfies the first threshold. The second score (e.g. 90) is compared against the second threshold. In this example, the user has set the second threshold relatively low, at 50, as there is a high urgency with the print job. In this case, the second score satisfies the second threshold. Given that both scores satisfy their respective thresholds, it is determined to continue the print job, e.g. not to immediately halt printing.

The cloud device 280 may send an alert or notification to the RES 150, indicating the issue and the decision taken. The alert may be presented to a user, on for example a graphical user interface of a device connected to the RES 150. The user may be provided with an override option on the graphical user interface. The cloud device 280 may schedule maintenance for the printer with the issue at a time after the print job is scheduled to be complete. The cloud device 280 may continue to monitor the situation with respect to the issue on the printer. For example, the cloud device 280 may update the first and second scores as time progresses. For example, if the temperature continues to rise, the effect on the print quality of the print job may increase (e.g. the print quality is reduced), causing the first score to drop.

If it is determined that an industrial printer having an issue requires remedial action (e.g. because one of the first or second scores do not satisfy a threshold, or for any other reason), the cloud device 280 may determine what remedial action should be taken. For example, the cloud device 280 may determine that the industrial printer requires replacing with a spare printer.

Figure 6:
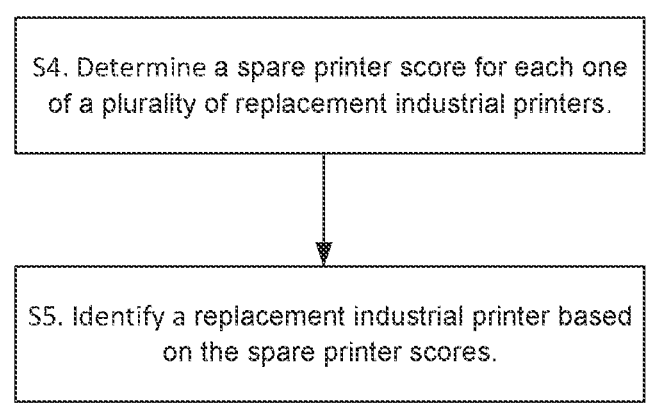
FIG. 6 illustrates a method disclosed herein.

FIG. 6 shows a method for identifying a replacement industrial printer from a plurality of replacement industrial printers. It is to be understood that determination of the remedial action can be determined separately from the method of detecting an issue. That is, any method for determining an issue may be used with the following method of selecting a replacement.

At step S4, a third score is determined for each one of a plurality of replacement industrial printers, said third score indicating a suitability of the industrial printer to be used as a replacement. The third score may be referred to as a spare printer score.

At step S5, the replacement industrial printer is identified based on the spare printer scores.

The following example follows on from the example above, but where the second threshold was set at 99. As such, the second score of 90 does not satisfy the second threshold and printing is halted such that remedial action can take place. The remedial action may be to replace the printer 102 with a spare printer 122, 124, 126.

The spare printer score is determined for each of the one or more spare printers 122, 124, 126. The spare printer score may be calculated for all spare printers, or only a subset of the spare printers. The spare printer score may be numerical, and may exist between an upper and lower bound, e.g. between 0 and 100. The spare printer score may be based on a number of sub-scores, each sub-score scoring a different criteria, such as any one or more of location of the spare printer, age of the spare printer, service history of the spare, elapsed time since service of the spare, history of use of the spare, operational status of the spare, consumable levels (such as ink level) in the spare printer, reliability of the spare printer, model number of the spare, or any other data described herein. The spare printer score may also be based on an importance of a print line upon which the printer is operating. For example, the spare printer may be a printer that is currently operating on another print line (e.g. print line 302). Each print line 301, 302 may comprise a score indicating its importance. For example, print line 301, which comprises printer 102 with the issue, may have a relatively high importance, whereas print line 302 may have a relatively low importance. As such, print line 301 may have a relatively high score and print line 302 may have a relatively low score. This allows a less important print line to be shut down in order to keep the more important print line in operation.

In the specific example, and for simplicity, only the location and reliability of the spare printers is scored. It will be appreciated that any number of scores may be used. Additionally, only two spare printers, 122 124 are considered, although, it will be appreciated that any number of spare printers may be considered. In the specific example, the cloud device 280 determines that spare printer 122 is located in storage area 303 at the print site 300 (e.g. is located relatively close to the printer 102). The location information may be determined using any method such as those described above. For example, the cloud device 280 may access database 281 and determine the locations of the printer 102 with the issue and the location of the spare printer 122.

The cloud device may determine a relative distance between the locations of the printer 102 with the issue and the location of the spare printer 122. The relative distance may be further based on layout or map data. For example, there may be multiple paths within a site 300 to get to the spare printer 122. The shortest path may be the more difficult, due to the difficulty or danger in passing a particular area. By taking into account the layout or map data, the most appropriate route to the spare printer 122 may be determined.

In another example, the cloud device may determine a relative distance between a user, such a remote technician and the location of the spare printer 122. The remote technician's location may be determined using any suitable means. For example, the remote technician may use a mobile device which determines its position using, for example, GPS, or cellular triangulation, etc. and which then reports this information the cloud device 280.

The cloud device 280 may give the spare printer 122 a relatively high location score, such as 90. The cloud device determines that the spare printer 122 is of an older model type, and is nearing the end of its operation life. As such, the cloud device determines a reliability score of 50.

The cloud device 280 determines that spare printer 124 is located several miles away in a storage area at another site (not shown). The cloud device 280 may give the spare printer 124 a relatively low location score, such as 10, given that the spare printer 124 is relatively far away from the printer 102 with the issue. The cloud device 280 further determines that the spare printer 124 is a new model type, and has barely been used. As such, the cloud device determines a reliability score of 99.

An aggregate score is determined for each spare printer based on the location score and reliability score. For example, an average of the location score and reliability score may be taken for each spare printer in order to determine the spare printer's score (e.g. the third score). Each score may be weighted. Weighting can be used to weight certain scores more than others. Weightings may be set by individual users, e.g. the user of the print line. For example, if a user determines that location is a primary factor, the location score may be weighted more highly than the reliability score. Similarly, if a user determines that speed is a primary factor (e.g. to minimise downtime of the print line), the location score may be weighted more highly than the reliability score. Alternatively, weightings may be determined without user input, e.g., default values, values based on historical data, values based on output from a trained machine learning model etc., or a combination thereof.

An example algorithm for determining the spare printer score in the present example may be: spare printer score= (location score*w1)+(reliability score*w2). In this example, the user may determine that location is a primary factor, and set weight w1 to 0.7, and that reliability is not as important, setting weight w2 to 0.3. Applying example algorithm for each spare printer gives:

Spare printer score 122:(90*0.7)+(50*0.3)=78

Spare printer score 124:(10*0.7)+(99*0.3)=36.7

In this specific example, spare printer 122 is selected as the replacement as it has a score is greater than the score for printer 124. The cloud device 280 provides a notification to the user highlighting the spare printer to be used as the replacement to the printer 102 with the issue. Further details may also be provided, such as the location of the spare printer 122, details on how to replace the printer, etc. Directions to the spare printer 122 may be provided. The directions may be determined based on layout data of the site or map data, e.g. the most efficient path to be taken may be provided. The notification regarding identification of the spare printer may be sent from the cloud device 280 to the RES 150. The notification may be routed from the RES 150 to any suitable computing device. Alternatively, the notification may be sent from the cloud device 280 directly to the user or a remote technician, e.g. to a mobile phone.

The various scores used to determine the spare printer score may be determined in real time at a point in time when an issue is determined, or can be calculated periodically and stored for later use, e.g. for when an issue is determined. Alternatively, a combination may be used. For example, the scores may be calculated periodically and stored. When an issue is determined such that a spare printer is required, the highest scoring spare printers (such as the top 10) are identified and, for those identified spare printers, the score is recalculated in real time.

Once a spare printer is determined and installed in the print line 301, the cloud device, or the RES 150, may be configured to automatically detect and/or configure the spare printer, e.g. to send configuration data to the spare printer (or remote technician), such that the spare printer can be operated in place of the printer 102 with the issue. For example, any data contained in the BJD 160, or at database 281, may be uploaded to the spare printer such that the spare printer can correctly operate on the print line as a replacement printer to printer 102. Alternatively, the required configuration data may be sent to a remote technician, e.g. their mobile phone, such that the remote technician may locally update the spare printer. By automatically configuring a spare printer when installed, the period of time in which the print line is halted is during replacement of the printer 102 is reduced.

The configuration data may require modification. For example, if the spare printer 124 is of a different model to that which it replaced, the format of the configuration data may need to be modified such that the configuration data can be used with the spare printer 124. Said modification may be determined and carried out by the cloud device 280, RES 150, or at a user terminal such as a mobile phone. Said modification may be carried out using any suitable means. For example, a database at the cloud device 280 may be provided which maps parameters of one printer model with corresponding parameters of another printer model. The database may be queried to determine the corresponding parameters for the replacement spare printer.

In another example, the spare printer, when installed on the print line 301, may automatically request the required configuration data, e.g. may send a message to the RES 150 requesting configuration data.

The database 281 may be used when determining service information. The database 281 may be used to determine when a service is required for the printers. For example, the data contained in the database 281 for printer 104 may be queried against service schedule criteria for printer 104, and if one or more of the data satisfies one or more of the service schedule criteria, an alert may be generated indicating that printer 104 requires servicing. For example, the service schedule criteria may specify that any printer that is run in a particular configuration requires a service after a particular time period. The data in the database may comprise data indicating the particular configuration of the printer 104, and may indicating the elapsed time since the printer 104 began printing. In this example, if the elapsed time is greater than the particular time period specified in the service schedule, it can be determined that the printer 104 requires servicing.

Not only can the data in the database be used to determine when a service is required, the data can additionally (or alternatively) be used to determine the service schedule criteria for each printer. The data collected in the database 281 may be correlated with known printer issues or failures. Trends in the data may identify when servicing should take place so as to avoid future issues or failures. For example, it may be observed that printers having a particular configuration, and that have been operated for period of time x have a 50% failure rate in the following period of time y. As such, it may be determined that printers having the particular configuration may require servicing after being operated for period of time x. That is, the service schedule criteria may be generated (or updated) to specify that printers having the particular configuration may require servicing after being operated for period of time x.

Machine learning models may be used to determine service schedules. For example, a machine learning model may be trained on data in the database, including failure data of printers, said failure data comprising any data indicating an issue or failure with a printer. The machine learning model may then learn to predict issues or failures of a printer based on the data.

Once it is determined that a printer needs to be serviced, the location of the printer may be determined as described above. Additionally, when providing a user with a notification that servicing is required, the location and optionally directions to the printer to be service may be provided.

As previously mentioned, machine learning models can be used in a variety of situations regarding industrial printers and print lines. For example, machine learning models can be used to predict issues or failures, determine service schedules, identify replacement printers, determine whether printing should be halted or maintained when an issue is detected (albeit sub-optimally), etc. For example, machine learning models can be used to determine any score described above. However, it will be understood that the scores described herein may be determined in any suitable way. For example, one or more lookup tables may be provided which, when given one or more data about a printer or fault, an associated score can be looked up and provided. The associated scores may be based on historical analysis of printer data, for example.

By providing a cloud based solution in the form of the cloud device 280 connected to one or more RES 150. A large amount of data relating to printers may be collected. As such, there is provided a large amount of training data.

The data may be provided to a machine learning model in any suitable way for training. The machine learning model may be any suitable machine learning model, such as a neural network or vector support machine. During training, any of the data relating to printers (e.g. in database 281) that developed issues may be provided to the machine learning model, and provided with a label that indicates that the printer had an issue. Data relating to printers that did not develop an issue may also be provided to the machine learning model, and provided with a label indicating that the printer did not develop an issue. The models may be trained based on minimising a loss function, for example.

In another example, unsupervised learning may be used. That is, unlabelled data may be used to train the model. By doing so, the machine learning model may detect previous undetected patterns in the data. For example, it may be determined that certain printers, operating in a certain way (e.g. having certain configurations), and in certain environmental conditions, use more ink than other printers in other environments. Such insight can be used to develop updated operating parameters for such printers in such environments.

Figure 7:
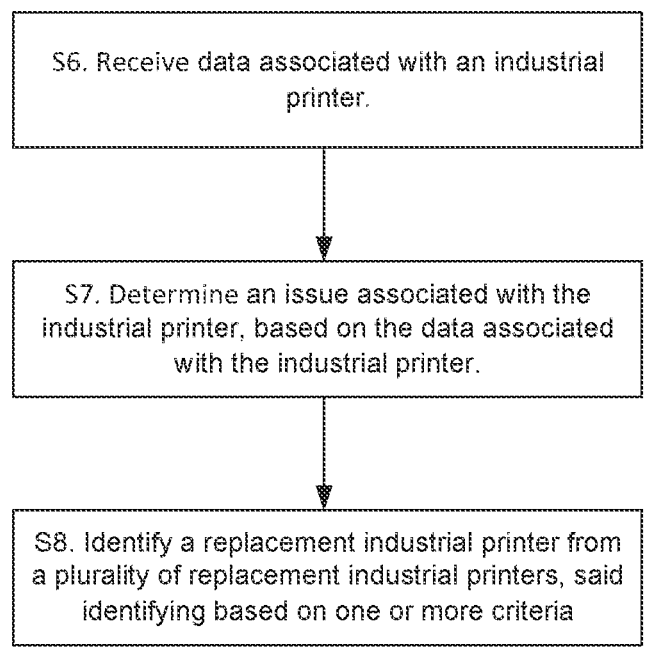
FIG. 7 illustrates a method disclosed herein.

FIG. 7 shows another method for determining the location of a replacement printer:

Step S6. Receive data associated with an industrial printer. The data may be received at the cloud device as described above.

Step S7. Determine an issue associated with the industrial printer based on the data. An issue may be determined as described above.

Step S8. Identify a replacement industrial printer from a plurality of replacement industrial printers, said identifying based on one or more criteria. That is, a decision may be made to select a particular printer as a replacement over another printer. The decision may be made at the cloud device 280. The identification may be made as described above. For example, the one or more criteria may be based on one or more scores satisfying one or more thresholds.

Note that there may not be any requirement for a determination of whether to continue printing (sub-optimally). That is, making a determination as to whether to continue printing, as described in step S3 above, is optional in this method.

FIG. 8 is a block diagram that illustrates a computer system 1200 (e.g., RES 150) upon which an embodiment of the disclosed subject matter may be implemented or employed. The computer system 1200 may be a server running server applications. The server may be a web server. The RES 150 may be coupled to printers via a network. The terms computing system, computing device, server and computer system may be used interchangeably herein. The term engine may include computing devices or components of a computer system, as well. Computer system 1200 includes a communication mechanism such as a bus 1210 for passing information between other internal and external components of the computer system 1200. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more blocks of one or more methods described herein. Thus, the computer system is a special purpose computer system.

A sequence of binary digits constitutes digital data that is used to represent a number or code for a character. A bus 1210 includes many parallel conductors of information so that information is transferred quickly among devices coupled to the bus 1210. One or more processors 1203 for processing information are coupled with the bus 1210. A processor 1203 performs a set of operations on information. The set of operations include bringing information in from the bus 1210 and placing information on the bus 1210. The set of operations also typically include comparing two or more units of information, shifting positions of units of information, and combining two or more units of information, such as by addition or multiplication. A sequence of operations to be executed by the processor 1203 constitutes computer instructions.

Computer system 1200 also includes a memory 1204 coupled to bus 1210. The memory 1204, such as a random access memory (RAM) or other dynamic storage device, stores information including computer instructions. The memory 1204 may also include dynamic memory which allows information stored therein to be changed by the computer system 1200. RAM allows a unit of information stored at a location called a memory address to be stored and retrieved independently of information at neighboring addresses. The memory 1204 is also used by the processor 1203 to store temporary values during execution of computer instructions. The computer system 1200 also includes a read only memory (ROM) 1206, non-volatile persistent storage device or static storage device coupled to the bus 1210 for storing static information, including instructions, that is not changed by the computer system 1200. The ROM 1206 may be a secure byte-addressable memory (storage) device or a direct-access for files (DAX) memory device. The bus 1210 may also have coupled thereto other storage devices including a non-volatile (persistent) storage device, such as a magnetic disk or optical disk, for storing information, including instructions, that persists even when the computer system 1200 is turned off or otherwise loses power.

Information, including instructions, is provided to the bus 1210 for use by the processor from an external input device 1213, such as a keyboard containing alphanumeric keys operated by a human user, or a sensor. A sensor detects conditions in its vicinity and transforms those detections into signals compatible with the signals used to represent information in computer system 1200. Other external devices coupled to bus 1210, used primarily for interacting with humans, include a display device 1214, such as a cathode ray tube (CRT) or a liquid crystal display (LCD), light emitting diode (LED) displays, for presenting images, and a pointing device 1216, such as a mouse or a trackball or cursor direction keys, for controlling a position of a small cursor image presented on the display device 1214 and issuing commands associated with graphical elements presented on the display 1214.

In the illustrated embodiment, special purpose hardware, such as an application specific integrated circuit (IC) 1230, may be coupled to bus 1210. The special purpose hardware may be configured to perform operations not performed by processor 1203 quickly enough for special purposes. Examples of application specific ICs include graphics accelerator cards for generating images for display device 1214, cryptographic boards for encrypting and decrypting messages sent over a network, speech recognition, and interfaces to special external devices.

Computer system 1200 also includes one or more instances of a communications interface 1270 coupled to bus 1210. Communication interface 1270 provides a two-way communication coupling to a variety of external devices that operate with their own processors, such as printers, scanners and external disks.

The communication interface 1270 may receive data from printers or other peripheral devices. Pointing device 1216, input device 1213 and display device 1214 may be associated with host computer 1282.

In general, the computer system 1200 through the communication interface 1270 may be coupled with a network link 1278 that is connected to a local network 1280 to which a variety of external devices with their own processors are connected. In some embodiments, the local network 1280 may be a private network and may include wired and/or wireless communications. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 may be a cable modem that converts signals on bus 1210 into signals for a communication connection over a coaxial cable or into optical signals for a communication connection over a fibre optic cable. As another example, communications interface 1270 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1270 sends and receives electrical, acoustic or electromagnetic signals, including infrared and optical signals, that carry information streams, such as digital data.

The term computer-readable medium is used herein to refer to any medium that participates in providing information to processor 1203, including instructions for execution. Such a medium may take many forms, including, but not limited to, non-volatile media, volatile media and transmission media. Non-volatile media include, for example, optical or magnetic disks, such as storage device. Volatile media include, for example, dynamic memory 1204. Transmission media include, for example, coaxial cables, copper wire, fibre optic cables, and waves that travel through space without wires or cables, such as acoustic waves and electromagnetic waves, including radio, optical and infrared waves. The term computer-readable storage medium is used herein to refer to any medium that participates in providing information to processor 1203, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1203, except for carrier waves and other signals.

Logic encoded in one or more tangible media includes one or both of processor instructions on a computer-readable storage media and special purpose hardware, such as ASIC 1230.

Network link 1278 typically provides information communication through one or more networks to other devices that use or process the information. For example, network link 1278 may provide a connection through a private or local network 1280 to a host computer 1282, such as a secure host computer. For example, in some embodiments, the pilot may be located at the host computer 1282. Thus, the user interfaces may be located with the host computer 1282. The host computer 1282 may also update and/or control the RES 150 from a remote location based on user responses or training session trends, by way of non-limiting example.

In some embodiments, the computer system 1200 may connect to equipment 1284 operated by an Internet Service Provider (ISP) or Intranet Service Provider. ISP equipment 1284 in turn provides data communication services through the public, world-wide packet-switching communication network of networks now commonly referred to as the Internet 1290 or alternately over an Intranet. A computer called a server 1293 connected to the Internet or Intranet provides a service in response to information received over the Internet or Intranet. For example, server 1293 provides information representing video data for presentation at display 1214 or the server may receive information representing video data. The cloud 280 may be accessible by computer system 1200 (i.e., RES 150) via ISP equipment 1284. The host 1282 may be part of a remote monitoring service (RMS) platform for communicating with and between the RES 150 and printers.

Aspects disclosed herein relate to the use of computer system 1200 for implementing the techniques described herein. According to one embodiment, those techniques are performed by computer system 1200 in response to processor 1203 executing one or more sequences of one or more instructions contained in memory 1204 to form a computer program product. Such instructions, also called software and program code, may be read into memory 1204 from another computer-readable medium such as storage device 1208. Execution of the sequences of instructions contained in memory 1204 causes processor 1203 to perform the method blocks described herein. In alternative embodiments, hardware, such as application specific integrated circuit 1230, may be used in place of or in combination with software to implement the disclosed subject matter. Thus, embodiments are not limited to any specific combination of hardware and software.

Computer program code for carrying out operations described above may be written in a variety of programming languages, including but not limited to a high-level programming language, such as without limitation, C or C++, for development convenience. In addition, computer program code for carrying out operations of embodiments described herein may also be written in other programming languages, such as, but not limited to, interpreted languages. The program code may include hardware description language (HDL) or very high speed integrated circuit (VHSIC) hardware description language, such as for firmware programming. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a non-transitory, tangible computer-readable storage medium such as a magnetic tape, a flexible disc, a hard disc, a compact disc, a photo-magnetic disc, a digital versatile disc (DVD) or the like.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server 1292 transmits program code for a particular application, requested by a message sent from computer 1200, through Internet 1290, ISP equipment 1284, local network 1280 and communications interface 1270. The received code may be executed by processor 1203 as it is received or may be stored in storage device 1208 or other non-volatile storage for later execution, or both. In this manner, computer system 1200 may obtain application program code in the form of a signal on a carrier wave.

Various forms of computer readable media may be involved in carrying one or more sequence of instructions or data or both to processor 1203 for execution. For example, instructions and data may initially be carried on a magnetic disk of a remote computer such as host computer 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red a carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1203 retrieves and executes the instructions using some of the data sent with the instructions. The instructions and data received in memory 1204 may optionally be stored on storage device 1208, either before or after execution by the processor 1203.

The memory 1204 may have stored thereon applications implemented as software or computer instructions. The applications when executed by the processor 1203 may perform one or more functions, steps or methods as described herein.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing"

or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

While certain processing and logic decisions have been described as being taken at the cloud device 280, it will be appreciated that said processing can take place on any processor, such as at the RES 150.

While the scores and thresholds have been described as being numerical values, it will be appreciated that any values may be used. For example, regarding the first score, which relates to how the print quality will be affected with the detected issue, the possible scores may be one of, poorest quality, low quality, average quality, high quality, highest quality. The corresponding first threshold may be average quality.

While the various scores and thresholds have been described as being either first, second, third scores, etc., it will be appreciated that use of the terms first, second, third, etc. is used to differentiate between different scores or thresholds, and is not meant to limit the scores or thresholds to a particular order.

Aspects and embodiments of the disclosed subject matter may be as set out in the following examples.

Example 1. A computer implemented method comprising:
  receiving data associated with an industrial printer, the industrial printer operating on a print line and executing a print job;
  determining, based on the data associated with the industrial printer, an issue associated with the industrial printer;
  determining, based on the issue, whether the industrial printer requires remedial action or if the industrial printer can continue to be operated with the issue.

Example 2. The computer implemented method of example 1, wherein determining whether the industrial printer requires remedial action or if the industrial printer can continue to be operated with the issue comprises:
  determining a first score, the first score indicative of an adverse effect on a print quality of the print job caused by the issue;
  comparing the first score with a first threshold, and if the first score satisfies the first threshold, continue printing, if the first score does not satisfy the first threshold, determine that remedial action is required.

Example 3. The computer implemented method of example 1 or 2, wherein determining whether the industrial printer requires remedial action or if the industrial printer can continue to be operated with the issue comprises:
  determining a second score, the second score indicative of an adverse effect to the industrial printer if the industrial printer is continued to be operated with the issue;
  comparing the second score with a second threshold, and if the second score satisfies the second threshold, continue printing, if the second score does not satisfy the second threshold, determine that remedial action is required.

Example 4. The computer implemented method of example 3, wherein if both the first score satisfies the first threshold and the second score satisfies the second threshold, determining that the industrial printer can continue to operate with the issue; and
  if one of the first score or second score does not satisfy the first threshold or second threshold respectively, determining that remedial action is required.

Example 5. The computer implemented method of examples 1 to 4, wherein the remedial action comprises replacement of the industrial printer and identifying said replacement comprises:
  identifying a replacement industrial printer from a plurality of replacement industrial printers; said identifying comprising:
    determining a third score for each one of a plurality of replacement industrial printers, said third score indicating a suitability of the industrial printer to be used as a replacement;
    identifying the replacement industrial printer based on the third scores.

Example 6. The computer implemented method of example 5, wherein the third scores are determined based on one or more sub-scores, the one or more sub-scores based on data relating to any one or more of location of the replacement industrial printer, age of the replacement industrial printer, service history of the replacement industrial printer, elapsed time since service of the replacement industrial printer, history of use of the replacement industrial printer, operational status of the replacement industrial printer, consumable levels in the replacement industrial printer, reliability of the replacement industrial printer, estimated time to obtain the replacement industrial printer, and/or model number of the replacement industrial printer.

Example 7. The computer implemented method of example 6, wherein determining the third score comprises determining an aggregate of the one or more sub-scores.

Example 8. The computer implemented method of example 7, further comprising weighting the one or more sub-scores by a respective weight.

Example 9. The computer implemented method of example 8, wherein the respective weights have a default value, are selected by a user, or determined using a machine learning model.

Example 10. The computer implemented method of examples 6 to 9, wherein data relating to location comprises a location of the replacement industrial printer.

Example 11. The computer implemented method of example 10, wherein the location comprises any one of a building, facility, workshop, storage area, or another print line.

Example 12. The computer implemented method of examples 6 to 11, wherein data relating to location comprises a relative distance between a location of the replacement industrial printer and a location of the printer identified as having the issue.

Example 13. The computer implemented method of any of examples 6 to 12, wherein determining the location data comprises using any one or more of Bluetooth®, RFID, WiFi®, Cellular network, GPS, Zigbee®, video analysis and sound analysis.

Example 14. The computer implemented method of example 13, wherein the location data is determined using a triangulation method.

Example 15. The computer implemented method of example 14, wherein the triangulation method is based on any one signal strength, fingerprinting, angle of arrival, and time of flight (ToF).

Example 16. The computer implemented method of any of examples 6 to 15, the method comprising:
providing a Bluetooth® receiver associated with an industrial printer;
distributing one or more Bluetooth® beacons at a print site comprising the print line, the Bluetooth® beacons configured to emit a signal;
receiving one or more signals at the Bluetooth® receiver;
determining location data associated with the industrial printer based on the one or more received signals from the Bluetooth® beacons.

Example 17. The computer implemented method of any of examples 6 to 16, further comprising: providing an RFID reader and associating one or more RFID tags with one or more industrial printers;
receiving one or more signals at the RFID reader, said one or more signals from an RFID tag; and
determining location data associated with an industrial printer based on the one or more received signals from the RFID tag.

Example 18. The computer implemented method of example 17, wherein the RFID tags comprise active or passive RFID tags.

Example 19. The computer implemented method of any of examples 6 to 18, wherein the method comprises associating a WiFi® transceiver to the one or more industrial printers, and providing one or more WiFi® access points at the print site comprising the print line;
receiving one or more signals at the WiFi® transceiver, said one or more signals from one or more of the WiFi® access points; and
determining location data associated with an industrial printer based on the one or more received signals from the WiFi® access points.

Example 20. The computer implemented method of any of examples 6 to 19, further comprising recording sound using one or more microphones, said one or more microphones associated with the replacement industrial printer, and determining location data based on the recorded sound.

Example 21. The computer implemented method of example 20, further comprising generating data associated with the recorded sound;
comparing data associated with the sound with a database, said database comprising data associated with sounds of particular locations;
determining a location based on said comparison.

Example 22. The computer implemented method of any of examples 5 to 21, further comprising recording one or more images using one or more cameras, said one or more cameras associated with the replacement industrial printer;
generating data associated with the recorded image;
analysing the data associated with the recorded image; and
determining a location based on said analysis.

Example 23. The computer implemented method of any preceding example, wherein determining, based on the data associated with the industrial printer, an issue associated with the industrial printer, comprises:
inputting the data associated with the industrial printer into a machine learning model;
obtaining an output from the machine learning model;
determining the issue based on the output of the machine learning model.

Example 24. A computer implemented method comprising:
receiving data associated with an industrial printer;
determining an issue associated with the industrial printer based on the data;
identifying a replacement industrial printer from a plurality of replacement industrial printers, said identifying based on one or more criteria.

Example 25. The computer implemented method of example 24, wherein identifying based on one or more criteria comprises:
determining a score associated with one or more of the plurality of replacement industrial printers;
identifying the replacement industrial printer based on said scores.

Example 26. The computer implemented method of examples 24 or 25, the score based on data relating to any one or more of location of the replacement industrial printer, age of the replacement industrial printer, service history of the replacement industrial printer, elapsed time since service of the replacement industrial printer, history of use of the replacement industrial printer, operational status of the replacement industrial printer, consumable levels in the replacement industrial printer, reliability of the replacement industrial printer, estimated time to obtain the replacement industrial printer, and/or model number of the replacement industrial printer.

Example 27. The computer implemented method of any of examples 24 to 26, wherein the one or more criteria is based on a location of the replacement industrial printer.

Example 28. A server comprising:
one or more processors
a non-transitory computer readable medium comprising instructions that when executed by the one or more processors, cause the one or more processors to carry out the method of any preceding example.

Example 29. A system comprising:
one or more industrial printers;
one or more replacement industrial printers;
a server, the server configured to:
receive data associated with the one or more industrial printers;
determine an issue associated with one or more of the industrial printers based on the data;
identify a replacement industrial printer from the one or more replacement industrial printers, said identifying based on one or more criteria.

Example 30. A non-transitory computer-readable storage medium having stored thereon instructions which, when executed by a processor, cause the processor to perform the method of any of examples 1 to 27.

The invention claimed is:

1. A method for determining whether an industrial printer requires remedial action or if the industrial printer can continue to be operated with an issue, the method comprising:
receiving, by a processor, data associated with an industrial printer, the industrial printer operating on a print line and executing a print job;
determining, by the processor and based on the data associated with the industrial printer, an issue associated with the industrial printer;
determining, by the processor and based on the issue, whether the industrial printer requires remedial action or if the industrial printer can continue to be operated with the issue without there being an adverse effect on the industrial printer due to the issue, wherein determining whether the industrial printer requires remedial action or if the industrial printer can continue to be operated with the issue without there being an adverse effect on the industrial printer due to the issue comprises:
  determining, by the processor, a score, the score indicative of an adverse effect on the industrial printer if the industrial printer is continued to be operated with the issue;
  comparing, by the processor, the score with a threshold;
  determining, by the processor, whether the score satisfies the threshold, and wherein:
    if it is determined, by the processor, that the score satisfies the threshold, determining, by the processor, to continue to operate the industrial printer with the issue; and
    if it is determined, by the processor, that the score does not satisfy the threshold, determining, by the processor, that remedial action is required.

2. The method of claim 1, wherein the score is indicative of the risk of damage to the industrial printer if the industrial printer is continued to be operated with the issue.

3. The method of claim 1, wherein the threshold indicates an acceptable level of risk damage that may occur with respect to the industrial printer if the industrial printer is continued to be operated with the issue.

4. The method of claim 1, wherein the data associated with the industrial printer may comprise any one or more of the operation status of the industrial printer, the model name/number of the industrial printer, owner of the industrial printer, configuration data or firmware of relating to the industrial printer, service history of the industrial printer, fault or issue history of the industrial printer, reliability of the industrial printer, importance of the print line on which the industrial printer is operating, any print job the printer is associated with, any batch information related to a batch job associated with the industrial printer, sensor data, user set parameter data, printer self-test data, and environmental data.

5. The method of claim 1, wherein the remedial action comprises replacement of the industrial printer and identifying the replacement comprises:
  identifying, by the processor, a replacement industrial printer from a plurality of replacement industrial printers; the identifying comprising:
    determining, by the processor, a second score for each one of a plurality of replacement industrial printers, the second score indicating a suitability of the industrial printer to be used as the replacement;
    identifying, by the processor, the replacement industrial printer based on the second scores.

6. The method of claim 5, wherein the second scores are determined based on one or more sub-scores, the one or more sub-scores based on data relating to any one or more of location of the replacement industrial printer, age of the replacement industrial printer, service history of the replacement industrial printer, elapsed time since service of the replacement industrial printer, history of use of the replacement industrial printer, operational status of the replacement industrial printer, consumable levels in the replacement industrial printer, reliability of the replacement industrial printer, estimated time to obtain the replacement industrial printer, and/or model number of the replacement industrial printer.

7. The method of claim 6, wherein data relating to the location of the replacement industrial printer comprises a location of the replacement industrial printer.

8. The method of claim 6, wherein data relating to the location of the replacement industrial printer comprises a relative distance between a location of the replacement industrial printer and a location of the printer identified as having the issue.

9. The method of claim 6, wherein determining, by the processor, the data relating to the location of the replacement industrial printer comprises using any one or more of a short range wireless communication protocol, RFID, Cellular network, satellite-based radio navigation system, or video analysis and sound analysis.

10. The method of claim 6, the method comprising:
  distributing one or more beacons at a print site comprising the print line, the beacons configured to emit a signal;
  receiving, by a receiver associated with the replacement industrial printer, one or more signals;
  determining, by the processor, the data relating to the location of the replacement industrial printer based on the one or more received signals from the one or more beacons.

11. The method of claim 6, further comprising:
  associating an RFID tag with the replacement industrial printer;
  receiving, by an RFID reader, one or more signals, the one or more signals from the RFID tag; and
  determining, by the processor, data relating to the location of the replacement industrial printer based on the one or more received signals from the RFID tag.

12. The method of claim 6, further comprising:
  distributing one or more access points at a print site comprising the print line, the one or more access points configured to emit a signal;
  associating a transceiver with the replacement industrial printer;
  receiving, by the transceiver, one or more signals, the one or more signals from the one or more of the access points; and
  determining, by the processor, data relating to the location of the replacement industrial printer based on the one or more received signals from the one or more access points.

13. The method of claim 6, further comprising;
  recording, by one or more cameras, one or more images, the one or more cameras associated with the replacement industrial printer;
  generating, by the processor, data associated with the recorded image;
  analysing, by the processor, the data associated with the recorded image; and
  determining, by the processor, data relating to the location of the replacement industrial printer based on the analysis.

14. The method of claim 1, wherein determining the issue associated with the industrial printer, comprises:
  inputting, by the processor, the data associated with the industrial printer into a machine learning model;
  obtaining, by the processor, an output from the machine learning model;
  determining, by the processor, the issue based on the output of the machine learning model.

15. The method of claim 1, further comprising:
  determining, by the processor, data indicative of an adverse effect on a print quality of the print job caused by the issue;
  determining, by the processor and based on the data indicative of an adverse effect on the print quality of the print job caused by the issue, that the industrial printer requires remedial action.

16. The method of claim 1, wherein determining whether the industrial printer requires remedial action or if the industrial printer can continue to be operated with the issue without there being an adverse effect on the industrial printer due to the issue comprises:
determining, by the processor, data indicative of the adverse effect to the industrial printer if the industrial printer is continued to be operated with the issue;
determining, by the processor and based on the data indicative of the adverse effect to the industrial printer if the industrial printer is continued to be operated with the issue, that the industrial printer requires remedial action.

17. The method of claim 1, further comprising:
determining, by the processor, first data indicative of an adverse effect on a print quality of the print job caused by the issue; and
determining, by the processor and based on both of the first data and second data the score, that the industrial printer requires remedial action.

18. The method of claim 1, wherein the score is a first score and the threshold is a first threshold, and wherein determining whether the industrial printer requires remedial action or if the industrial printer can continue to be operated with the issue further comprises:
determining, by the processor, a second score, the second score indicative of an adverse effect on a print quality of the print job caused by the issue;
comparing, by the processor, the second score with a second threshold; determining, by the processor, whether the first score satisfies the first threshold, and wherein:
if it is determined, by the processor, that the second score satisfies the second threshold, determining, by the processor, to continue to operate the industrial printer with the issue; and
if it is determined, by the processor, that the second score does not satisfy the second threshold, determining, by the processor, that remedial action is required.

19. A server comprising:
one or more processors;
a non-transitory computer readable medium comprising instructions that when executed by the one or more processors, cause the one or more processors carry out a method for determining whether an industrial printer requires remedial action or if the industrial printer can continue to be operated with an issue, the method comprising:
receiving, by the one or more processors, data associated with an industrial printer, the industrial printer operating on a print line and executing a print job;
determining, by the one or more processors and based on the data associated with the industrial printer, an issue associated with the industrial printer;
determining, by the one or more processors and based on the issue, whether the industrial printer requires remedial action or if the industrial printer can continue to be operated with the issue without there being an adverse effect on the industrial printer due to the issue, wherein determining whether the industrial printer requires remedial action or if the industrial printer can continue to be operated with the issue without there being an adverse effect on the industrial printer due to the issue comprises:
determining, by the one or more processors, a score, the score indicative of an adverse effect on the industrial printer if the industrial printer is continued to be operated with the issue;
comparing, by the one or more processors, the score with a threshold;
determining, by the one or more processors, whether the score satisfies the threshold, and wherein:
if it is determined, by the one or more processors, that the score satisfies the threshold, determining, by the one or more processors, to continue to operate the industrial printer with the issue; and
if it is determined, by the one or more processors, that the score does not satisfy the threshold, determining, by the one or more processors, that remedial action is required.

20. A non-transitory computer-readable storage medium having stored thereon instructions which, when executed by a processor, cause the processor to:
receive data associated with an industrial printer, the industrial printer operating on a print line and executing a print job;
determine, based on the data associated with the industrial printer, an issue associated with the industrial printer;
determine, based on the issue, whether the industrial printer requires remedial action or if the industrial printer can continue to be operated with the issue without there being an adverse effect on the industrial printer due to the issue, wherein determining whether the industrial printer requires remedial action or if the industrial printer can continue to be operated with the issue causes the processor to:
determine a score indicative of an adverse effect on the industrial printer if the industrial printer is continued to be operated with the issue;
compare the score with a threshold;
based on the score satisfying the threshold, determine to continue to operate the industrial printer with the issue; and
based on the score not satisfying the threshold, determine that remedial action is required.

* * * * *